United States Patent
Rivera

(10) Patent No.: US 8,066,384 B2
(45) Date of Patent: Nov. 29, 2011

(54) IMAGE PROJECTION KIT AND METHOD AND SYSTEM OF DISTRIBUTING IMAGE CONTENT FOR USE WITH THE SAME

(75) Inventor: Ricardo Rivera, Philadelphia, PA (US)

(73) Assignee: Klip Collective, Inc.

( * ) Notice: Subject to any disclaimer, the term of this patent is extended or adjusted under 35 U.S.C. 154(b) by 513 days.

(21) Appl. No.: 12/186,335

(22) Filed: Aug. 5, 2008

(65) Prior Publication Data
US 2009/0091711 A1 Apr. 9, 2009

Related U.S. Application Data

(63) Continuation-in-part of application No. 11/200,906, filed on Aug. 10, 2005, now Pat. No. 7,407,297.

(60) Provisional application No. 60/602,544, filed on Aug. 18, 2004.

(51) Int. Cl.
*G03B 21/14* (2006.01)
(52) U.S. Cl. ............ 353/28; 353/122; 345/419; 345/653
(58) Field of Classification Search ............... 353/28, 353/30, 121, 122; 345/418, 419, 420, 629, 345/653
See application file for complete search history.

(56) References Cited

U.S. PATENT DOCUMENTS

| | | | | |
|---|---|---|---|---|
| 4,981,360 A | * | 1/1991 | Schwarz | 356/605 |
| 5,161,013 A | * | 11/1992 | Rylander et al. | 348/744 |
| 5,694,142 A | * | 12/1997 | Dumoulin et al. | 345/9 |
| 5,795,046 A | * | 8/1998 | Woo | 353/69 |
| 6,000,801 A | * | 12/1999 | Dillon et al. | 353/28 |
| 6,075,872 A | * | 6/2000 | McGuire | 382/100 |
| 6,431,711 B1 | * | 8/2002 | Pinhanez | 353/69 |
| 6,677,956 B2 | * | 1/2004 | Raskar et al. | 345/581 |
| 6,709,116 B1 | * | 3/2004 | Raskar et al. | 353/121 |
| 6,712,477 B2 | * | 3/2004 | Idaszak et al. | 353/122 |
| 6,793,350 B1 | * | 9/2004 | Raskar et al. | 353/121 |
| 6,811,264 B2 | * | 11/2004 | Raskar et al. | 353/94 |
| 7,182,465 B2 | * | 2/2007 | Fuchs et al. | 353/69 |
| 7,355,584 B2 | | 4/2008 | Hendriks et al. | |
| 7,385,600 B2 | * | 6/2008 | Marion | 345/419 |
| 7,768,527 B2 | * | 8/2010 | Zhang et al. | 345/619 |

(Continued)

*Primary Examiner* — William C Dowling
(74) *Attorney, Agent, or Firm* — The Belles Group, P.C.

(57) ABSTRACT

An image projection kit and a imagery content distribution system and method. In one aspect, the invention is a kit for projecting imagery content onto architecture comprising: a projector apparatus comprising a housing containing an image sensor sub-system and an image projector subsystem, a single-reflex lens assembly in operable cooperation with the image sensor sub-system and the image projector sub-system, at least one port for receiving and/or sending data signals, and a processor operably connected to the image sensor sub-system, the image projector sub-system and the at least one port of the projector apparatus; a mechanism for mounting the projector apparatus in a fixed orientation having a line a sight to the architecture; a control unit comprising a housing, at least one port for receiving and/or sending data signals and a processor operably connected to the at least one port of the control unit; and a software package for installation on a computer, the software package containing computer code for rendering a composition window on the computer wherein a map corresponding to the architecture can be created, the map comprising at least one matte whose image is projected onto a surface of the architecture, and wherein the size, shape, position, orientation, or any combination thereof of the at least one matte can be adjusted within the composition window so that the projected image of the matte corresponds with the surface of the architecture.

9 Claims, 19 Drawing Sheets

U.S. PATENT DOCUMENTS

| | | |
|---|---|---|
| 2002/0031316 A1 | 3/2002 | Lowry |
| 2002/0034392 A1 | 3/2002 | Baum et al. |
| 2002/0097967 A1 | 7/2002 | Lowry |
| 2002/0113950 A1 | 8/2002 | Vlahos |
| 2002/0163720 A1 | 11/2002 | Piepel et al. |
| 2002/0163722 A1 | 11/2002 | Gehring et al. |
| 2003/0001939 A1 | 1/2003 | Scofield et al. |
| 2003/0020667 A1 | 1/2003 | Essig et al. |
| 2003/0098957 A1* | 5/2003 | Haldiman ............... 353/69 |
| 2003/0117639 A1 | 6/2003 | Milton et al. |
| 2003/0163367 A1 | 8/2003 | Piepel et al. |
| 2003/0231261 A1* | 12/2003 | Bassi et al. ............. 348/745 |
| 2004/0001059 A1 | 1/2004 | Pfister et al. |
| 2004/0076313 A1 | 4/2004 | Bronstein et al. |
| 2004/0095348 A1 | 5/2004 | Bleiweiss et al. |
| 2004/0141157 A1* | 7/2004 | Ramachandran et al. ...... 353/70 |
| 2004/0169827 A1* | 9/2004 | Kubo et al. ............. 353/94 |
| 2004/0207566 A1 | 10/2004 | Essig et al. |
| 2004/0240754 A1 | 12/2004 | Smith et al. |
| 2005/0017967 A1* | 1/2005 | Ratti et al. ............. 345/418 |
| 2005/0068537 A1 | 3/2005 | Han et al. |
| 2005/0073544 A1 | 4/2005 | Scofield et al. |
| 2005/0081161 A1 | 4/2005 | MacInnes et al. |
| 2005/0103329 A1 | 5/2005 | Essig et al. |
| 2005/0122536 A1 | 6/2005 | Selan |
| 2005/0128751 A1 | 6/2005 | Roberge et al. |
| 2005/0174473 A1 | 8/2005 | Morgan |
| 2005/0243085 A1* | 11/2005 | Schechter et al. ............ 345/419 |
| 2005/0276441 A1 | 12/2005 | Debevec |
| 2005/0285860 A1 | 12/2005 | Pfister et al. |
| 2006/0001839 A1 | 1/2006 | Beardsley et al. |
| 2006/0002110 A1 | 1/2006 | Dowling et al. |
| 2006/0022214 A1 | 2/2006 | Morgan et al. |
| 2006/0028400 A1 | 2/2006 | Lapstun et al. |
| 2006/0033674 A1 | 2/2006 | Essig et al. |
| 2006/0038814 A1 | 2/2006 | Rivera |
| 2006/0146047 A1 | 7/2006 | Marion |
| 2006/0250503 A1 | 11/2006 | Crutchfield et al. |
| 2006/0251298 A1 | 11/2006 | Bronstein et al. |
| 2006/0263758 A1 | 11/2006 | Crutchfield et al. |
| 2006/0291851 A1 | 12/2006 | Nozaki et al. |
| 2007/0024756 A1 | 2/2007 | Matusik et al. |
| 2007/0025727 A1 | 2/2007 | Matusik et al. |
| 2007/0063981 A1 | 3/2007 | Galyean et al. |
| 2007/0133034 A1 | 6/2007 | Jindal et al. |
| 2007/0145915 A1 | 6/2007 | Roberge et al. |
| 2007/0164955 A1 | 7/2007 | Noguchi et al. |
| 2007/0216905 A1 | 9/2007 | Han et al. |
| 2007/0279412 A1 | 12/2007 | Davidson et al. |
| 2007/0279415 A1 | 12/2007 | Sullivan et al. |
| 2008/0206720 A1 | 8/2008 | Nelson |
| 2009/0027415 A1 | 1/2009 | Dispoto et al. |
| 2009/0079987 A1 | 3/2009 | Ben-Ezra et al. |
| 2009/0080036 A1 | 3/2009 | Paterson et al. |
| 2009/0091711 A1 | 4/2009 | Rivera |
| 2009/0167682 A1 | 7/2009 | Yamashita |
| 2009/0195643 A1 | 8/2009 | Neuman |
| 2009/0201309 A1 | 8/2009 | Demos |
| 2009/0237492 A1 | 9/2009 | Kikinis et al. |
| 2009/0237510 A1 | 9/2009 | Chen et al. |
| 2009/0237564 A1 | 9/2009 | Kikinis et al. |
| 2009/0238378 A1 | 9/2009 | Kikinis et al. |
| 2009/0284527 A1 | 11/2009 | Ofek et al. |
| 2009/0292614 A1 | 11/2009 | Reichow et al. |
| 2010/0033682 A1* | 2/2010 | LaDuke et al. ............... 353/28 |
| 2010/0066977 A1 | 3/2010 | Gutierrez et al. |
| 2010/0066978 A1 | 3/2010 | Powell et al. |
| 2010/0171145 A1 | 7/2010 | Morgan et al. |
| 2010/0245995 A1 | 9/2010 | Graetz et al. |
| 2010/0280988 A1 | 11/2010 | Underkoffler et al. |
| 2010/0281440 A1 | 11/2010 | Underkoffler et al. |
| 2010/0315422 A1 | 12/2010 | Bartley et al. |
| 2011/0001935 A1* | 1/2011 | Reale et al. ............... 353/28 |
| 2011/0018903 A1 | 1/2011 | Lapstun et al. |
| 2011/0043812 A1 | 2/2011 | Han et al. |

\* cited by examiner

IMAGE PROJECTION KIT AND METHOD AND SYSTEM OF DISTRIBUTING IMAGE CONTENT FOR USE WITH THE SAME

CROSS-REFERENCE TO RELATED PATENT APPLICATIONS

The present application is a continuation-in-part of U.S. patent application Ser. No. 11/200,906, filed Aug. 10, 2005, which is to issue as U.S. Pat. No. 7,407,297, which in turn claims the benefit of U.S. Provisional Patent Application 60/602,544, filed Aug. 18, 2004, the entireties of which are incorporated herein by reference.

FIELD OF INVENTION

The present invention relates generally to the field of systems for projecting imagery onto three-dimensional architecture, and specifically to user-friendly image projection kits, software and methods for accomplishing the same, including a method and system for distributing image content to users for use with said image projection kits.

BACKGROUND OF THE INVENTION

Conventional systems and methods of projecting images onto flat display surfaces are well-known. In the most simple example, a projector is positioned at a desired distance from a flat display surface so that the projector is substantially normal to the surface (i.e. e, the projection angle is normal to the display surface). Suitable flat surfaces often include movie screens, walls, ceilings, etc. Because the projection angle is substantially normal to the display surface, and because the display surface is substantially flat, projected images will not experience significant optical distortion.

The projection of images onto more complex surfaces, such as curved, angled, or adjoining non-coplanar surfaces, is also known. Conventional projection systems and methods, however, can not project images onto such surfaces without substantial optical distortion of the image. When a conventional projection system/method is used to project images onto such complex surfaces, optical distortion of the image results from the projection angle being other than normal for at least a portion of the display surface. Thus, distortion of the projected image is perceived when conventional projection systems/methods are used to project onto adjacent walls, adjacent walls and ceilings, non-planar surfaces, non-coplanar surfaces, curved surfaces, or the like. Thus, conventional projection systems/methods are limited to projecting images on display surfaces where the projection angle is normal to the display surface and the display surface is substantially flat.

In order to compensate for the optical distortion resulting from the projection angle being other than normal to the display surface and/or the display surface being other than flat, advanced projections techniques and systems have been developed to compensate for these optical distortion problems (such as those projections systems used to project images onto broad, curved screens, such as in IMAX theaters). Existing projection systems address the distortion problem through digital manipulation techniques that alter the dimensions of the still images or video. One such digital manipulation technique that is well known in the art is that of "keystoning."

During a keystone digital correction technique, the dimensions of the image to be projected onto the display surface are altered so that the image appears distorted prior to projection, often into the shape of a keystone. When the distorted image is then projected onto an angled display surface (or at a projection angle other than normal), the image appears undistorted on the display surface from the viewer's perspective.

Such projection systems are limited in direction, area of projection, and the number of surfaces or objects within the area of projection upon which an image is capable of being displayed. Moreover, many such systems must be manually manipulated as an initial step in order to allow for the projection image to be seen on adjacent walls without the appearance of distortion. Furthermore, such systems are limited in that they can only project on adjacent surfaces, e.g., wall and adjacent wall, wall and adjacent ceiling, or the like. Such systems cannot project images onto multiple non-contiguous and/or non-adjacent surfaces within a three-dimensional area. In order to accomplish the projection of images on multiple non-contiguous and/or non-adjacent surfaces, multiple projection devices must be employed.

Finally, it is not known to project continuous video images onto adjacent walls or flat screens joined at corners. Home, office and theater projection is currently limited to single contiguous surfaces, because images cannot be projected onto adjacent walls or onto walls and ceilings without distortion. Thus, there is a need for coordinated projection of video or digitized film simultaneously onto multiple surfaces joined at corners.

SUMMARY OF THE INVENTION

It is therefore an object of the present invention to provide a system and method that can project images onto non-coplanar and non-adjacent surfaces of an architecture without optical distortion.

Another object of the present invention is to provide a system and method of projecting images onto surfaces in such a manner that the image appears to be floating.

Yet another object of the present invention is to provide a system and method of projecting images that provides an efficient and simple way of mapping the surfaces of an architecture onto which images are to be displayed.

Still another object of the present invention is to provide a system and method of projecting images that projects different visual elements onto specific areas and surfaces of an architecture from one projection source.

A further object of the present invention is to provide a system and method of projecting images that can coordinate projection of video and/or digitized film simultaneously onto multiple surfaces joined at corners.

A yet further object of the present invention is to provide a system and method of projecting images that masks those surfaces of the architecture that are not being used for the display of images.

A still further object of the present invention is to provide a system and method of projecting images that creates a map of the architecture that can be re-used.

Another object of the present invention is to provide a system and method of projecting images that integrates architecture, light, and darkness into an immersive environment.

Another object of the present invention is to provide an image projection kit that is easy to use.

Yet another object is to provide a projection clip distribution system and method.

These and other objects are met by the present invention, which in one aspect is a kit for projecting imagery content onto architecture comprising: a projector apparatus comprising a housing containing an image sensor sub-system and an image projector sub-system, a single-reflex lens assembly in operable cooperation with the image sensor sub-system and the image projector sub-system, at least one port for receiving and/or sending data signals, and a processor operably connected to the image sensor sub-system, the image projector sub-system and the at least one port of the projector apparatus; a mechanism for mounting the projector apparatus in a fixed orientation having a line a sight to the architecture; a control unit comprising a housing, at least one port for receiving and/or sending data signals and a processor operably connected to the at least one port of the control unit; and a software package for installation on a computer, the software package containing computer code for rendering a composition window on the computer wherein a map corresponding to the architecture can be created, the map comprising at least one matte whose image is projected onto a surface of the architecture, and wherein the size, shape, position, orientation, or any combination thereof of the at least one matte can be adjusted within the composition window so that the projected image of the matte corresponds with the surface of the architecture.

In another aspect, the invention can be a system for distributing imagery content and/or displaying imagery content on an architecture comprising: a projector apparatus secured at a location having a line of sight to the architecture, the projector having at least one port for receiving and/or sending data signals; a computer having software for rendering a composition window wherein a map corresponding to the desired architecture can be created, the map comprising at least one matte whose image is projected onto a surface of the architecture, and wherein the size, shape, position, orientation, or any combination thereof of the at least one matte can be adjusted within the composition window until the projected image of the matte corresponds with the surface of the architecture; an electronic library on the computer for storing imagery content files for insertion into the at least one matte; a server in operable communication with the computer via a wide area network, the server storing a plurality of imagery content files that can be downloaded to the computer via the wide area network; means for authenticating a user's identity prior to allowing downloading of the plurality of imagery content files from the server; means for tracking the imagery content files downloaded by the user; and means for charging the user a fee for the imagery content files downloaded by the user.

In yet another aspect, the invention can be a method of distributing projection clip files and/or displaying imagery associated with projection clip files on an architecture comprising: a) storing a plurality of projection clip files on a server that is accessible via a wide area network; b) authenticating a user's identity prior to allowing downloading of projection clip files stored on the server; c) identifying the projection clip files downloaded by the authenticated user; and d) charging the user a fee for the projection clip files downloaded by the user.

DETAILED DESCRIPTION OF THE DRAWINGS

Base Mapping Technique & System

Figure 1:
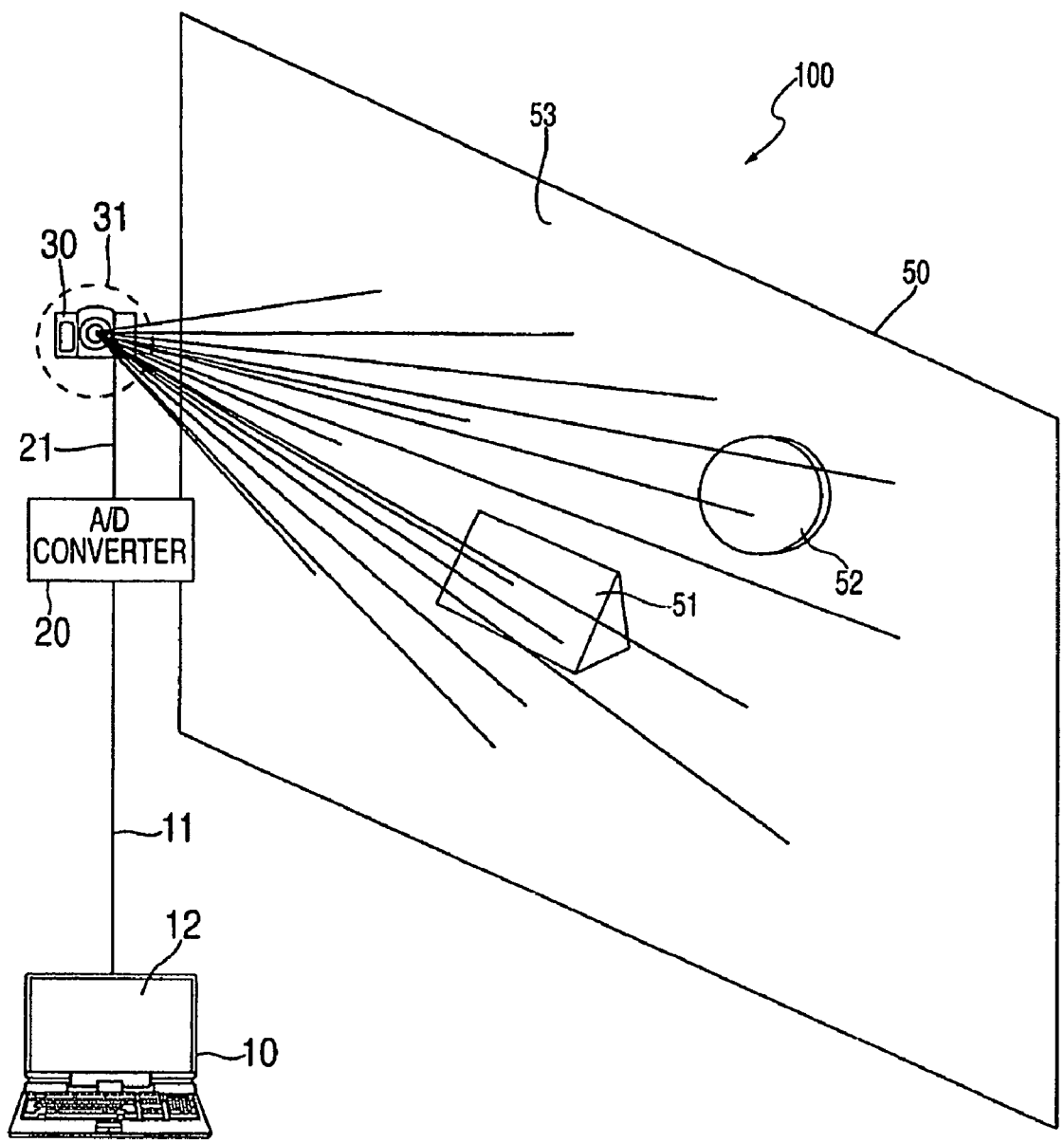
FIG. 1 is a schematic of an image projection system according to an embodiment of the present invention.

FIG. 1 illustrates an image projection system 100 according to an embodiment of the present invention. In addition to being able to project different visual elements (i.e., imagery content) onto objects/architectures, the image projection system 100 also has the capabilities to map the surfaces of the such three-dimensional architectures. As will be described in detail below, the image projection system 100 can project imagery content onto a plurality of non-coplanar and non-adjacent surfaces of an architecture without the imagery content experiencing optical distortion. As used herein, the term architecture is not limited to building structures but includes, without limitation, any surface, combination of surfaces, objects, sculptures, or the like.

The image projection system 100 can be used to project all kinds of imagery content, including, without limitation, still photographs, video clips, still digital images, streaming digital video, movies, or any other visual content. Preferably, video clips that have no camera movement (which lends itself to the illusion), ambient images basically a moving photograph), "loopable" clips (in point and out point matched), and "floaters" (clips shot in front of a black backdrop) are used.

In utilizing the image projection system 100, imagery content can be projected onto different surfaces of the architecture as a plurality of separate images or as a coordinated single image. Moreover, if desired, the image projection system 100 can be modified to simultaneously generate audio that corresponds to the imagery content being displayed. Depending on the nature of the imagery content being displayed, the addition of audio can enhance an observer's sensory experience and/or make the projected illusion more believable. This can be done by adding a separated stereo system, by coupling speakers to the laptop computer 10, or by activating speakers built into the laptop computer 10.

The image projection system 100 comprises a laptop computer 10, an analog/digital ("A/D") converter 10, and a video projector 30. While a laptop computer 10 is illustrated, any other type of computer or processing unit can be used that is capable of performing the functions described throughout this application. The exact processing capabilities, memory needs, and hardware requirements of the laptop computer will be dictated on a case-by-case basis, taking into consideration such factors as the complexity of the architecture being mapped and the complexity of the imagery content to be projected.

The laptop computer 10 is operably connected to the A/D converter 20 via a connector cable 11, such as a firewire, a DSL cable, a fiberoptic line, an s-video cable, or the like. Preferably, a high speed data transmission line is used. Utilizing a high speed port, such as a firewire port, makes it possible to transmit data to the projector 30 from the laptop computer 10, and project the corresponding imagery onto the architecture in real time.

The A/D converter 20 is in turn operably connected to the projector via a connector cable 21, such as an s-video cable or the like. The invention is not, however, limited to any specific type of connection cable so long as the components of the system 100 can operably communicate with one another and/or transmit data therebetween. In an alternative embodiment, any and/or all operable connections can be wireless, utilizing radio frequency ("RF") signals, infra-red ("IR") signals, or the like.

Moreover, while an A/D converter 20 is used to facilitate data transmission/communication between the laptop computer 10 and the video projector 30, any digital video ("DV") device may be used. For example, in some embodiments of the invention, it may be preferable to use a mini-DV digital camera in place of the A/D converter 20 because the mini-DV digital camera can act as a real time converter. In other words, the mini-DV digital camera can create an accurate registration of the video mapping, and implementation thereof, such that the camera keeps the video aspect ratio and alignment proper and calibrated. While utilizing a DV device that allows real time conversion of data transmitted to the video projector 30 from the laptop computer 10 is preferred, the invention is not so limited.

The laptop computer 10 has a video compositing software application or a similar program loaded thereon. One example of a video compositing application suitable for use with the present invention is Adobe® After Effects®. The video compositing application allows a user to see in real-time to a video source. When the image projection system 100 is functioning, the video compositing application allows a user to essentially see on the display screen 12 of the laptop computer 10 (and control in real time) what is being projected onto the surfaces of the architecture 50 itself. This is exemplified in FIGS. 2A-7B.

The image projection system 100 enables a user to utilize a single projector 30 to cast imagery content on multiple surfaces of the three-dimensional architecture 50, such as the surfaces 51-53. The image projection system 100 compensates for distortions when projecting onto the non-coplanar and/or non-adjacent surfaces within the three-dimensional architecture 50, integrating architecture, light, and darkness into an immersive environment.

Figure 8:
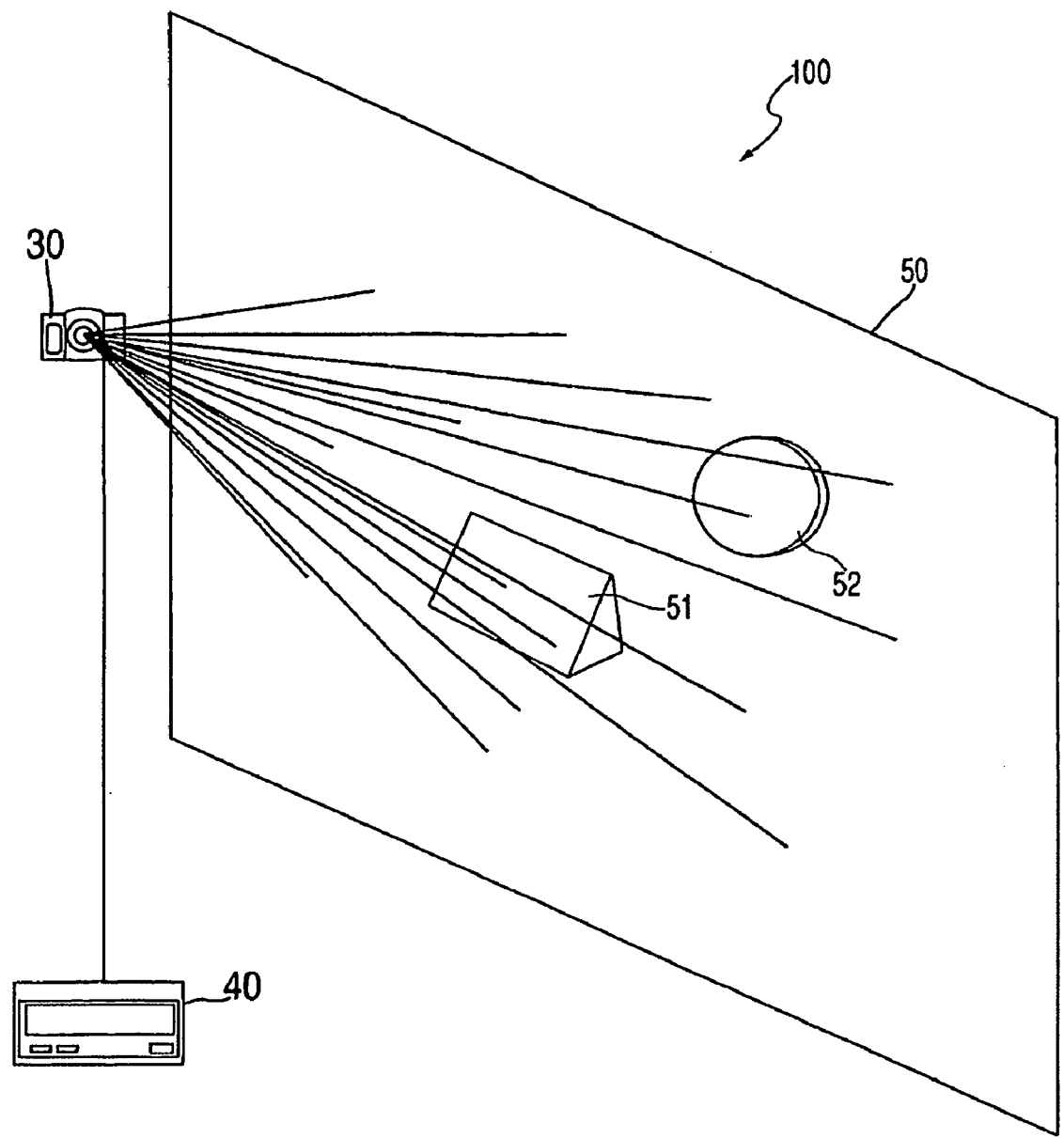
FIG. 8 is a schematic of the image projection system of FIG. 1 wherein the laptop computer and A/D converter is replaced with a DVD player.
Figure 9:
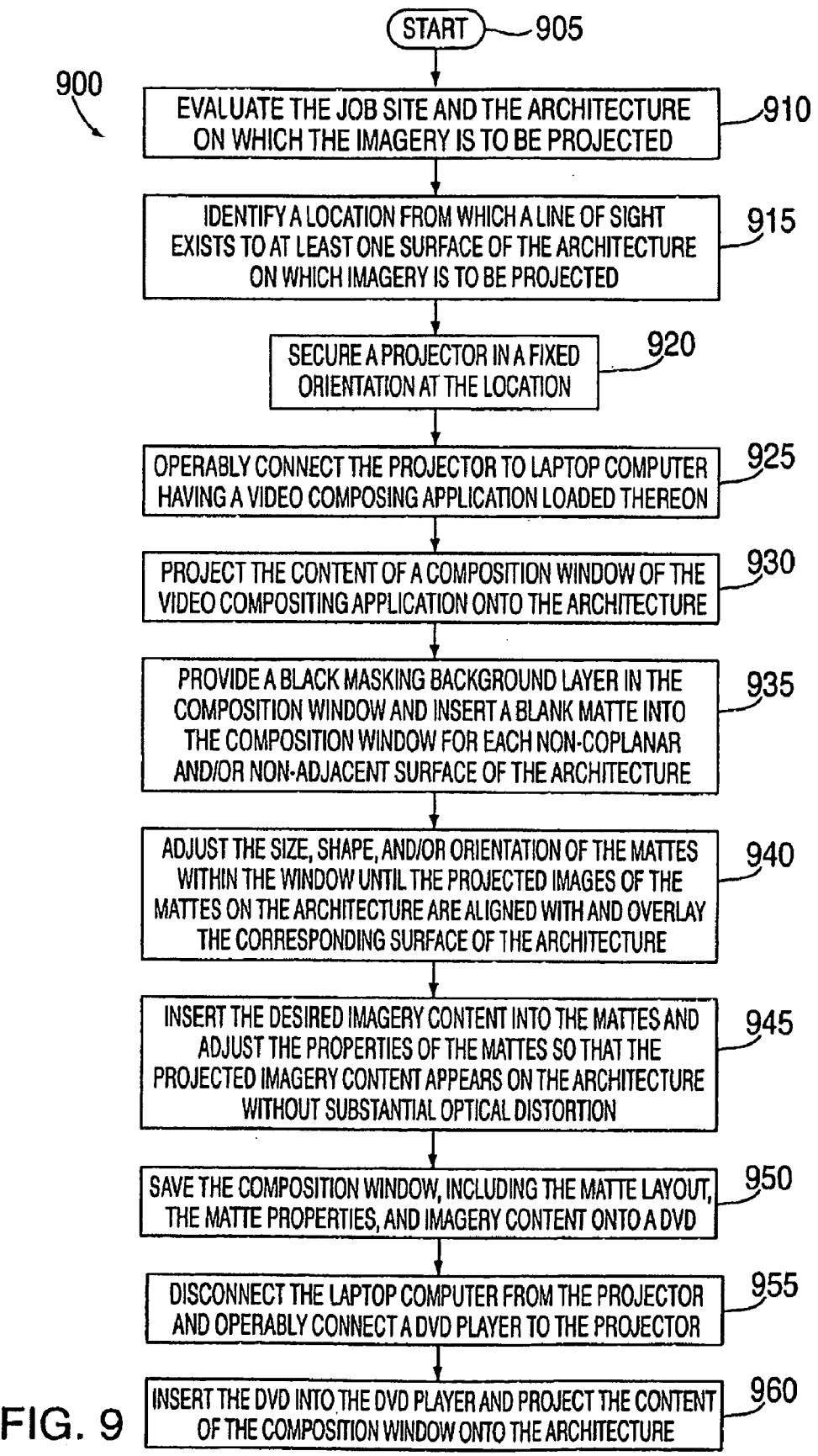
FIG. 9 is a flowchart of an image mapping and projection method according to an embodiment of the present invention.

Referring now to FIG. 9, a flowchart of a method for mapping the architecture of the architecture 50, and for projecting imagery content onto the architecture 50 based on the map created, is illustrated according to an embodiment of the present invention. For ease of discussion, the inventive method of FIG. 9 will be described below in relation to the image projection system 100 of FIG. 1, the various interfaces shown in FIGS. 2A-7A, and the image projection system 800 of FIG. 8. However; those skilled in the art will appreciate that the method of the present invention is not limited to any specific system, hardware, software, or arrangement of components.

Referring to FIG. 1, once an architecture is identified on which imagery content is to be projected, the user of the image projection system 100 evaluates the architecture 50 and identifies the surfaces of the architecture 50 that are to be projected on, thereby completing step 910 of FIG. 9. In the example, it is desired to project imagery content onto the circular surface 52 and the rectangular surface 51. The surfaces 51 and 52 are non-coplanar and non-adjacent to one another.

The user then identifies a location 31 at the work site from which a line-of-sight exists to at least one of the surfaces 51, 52, completing step 915 of FIG. 9. When possible, it is preferred that a location be identified from which a line-of-sight exists to all of the surfaces 51, 52 on which imagery content is to be projected. In those instances where a location does not exists that affords a line of sight to the entirety of all of the surfaces of an architecture on which imagery is to be projected, additional projectors can be utilized. In such embodiments, the mapping and projection processes discussed herein will be performed for all of the projectors, and the projection of the imagery content by the different projectors will be coordinated.

Once a location 31 is identified from which a line-of-sight exists to the desired surfaces 51, 52, the video projector 30 is secured at the location 31. The video projector 30 is secured at the location 31 in a fixed orientation that affords the video projector 30 the ability to project imagery content onto the surfaces 51, 52, thereby completing step 920 of FIG. 9. This "locking-down" of the projector device 30 is performed prior to any video or other image content being rendered.

In traditional prior art projections systems, the video projection/presentation is utilized after all the video is produced. However, with the present invention, the video projector 31 is preferably "locked-down" in place before the video production begins. As discussed below, it is through the "locked-down" position that the mapping process occurs. The video projector 30 can be secured at the location 31 via any means possible, including bolting, brackets, clamping, screwing, nailing, gluing, magnetism, etc. Moreover; the video projector 30 can be secured so as to be easily removable from the location 31 or it can be fixedly attached thereto.

Once the projector device is "locked-down," the projector device 30 is operably connected to the laptop computer 10 as described above, thereby completing step 925 of FIG. 9. The laptop computer 10 has a video post-production compositing program loaded thereon, which in this embodiment is Adobe® After Effects®.

Figure 2A:
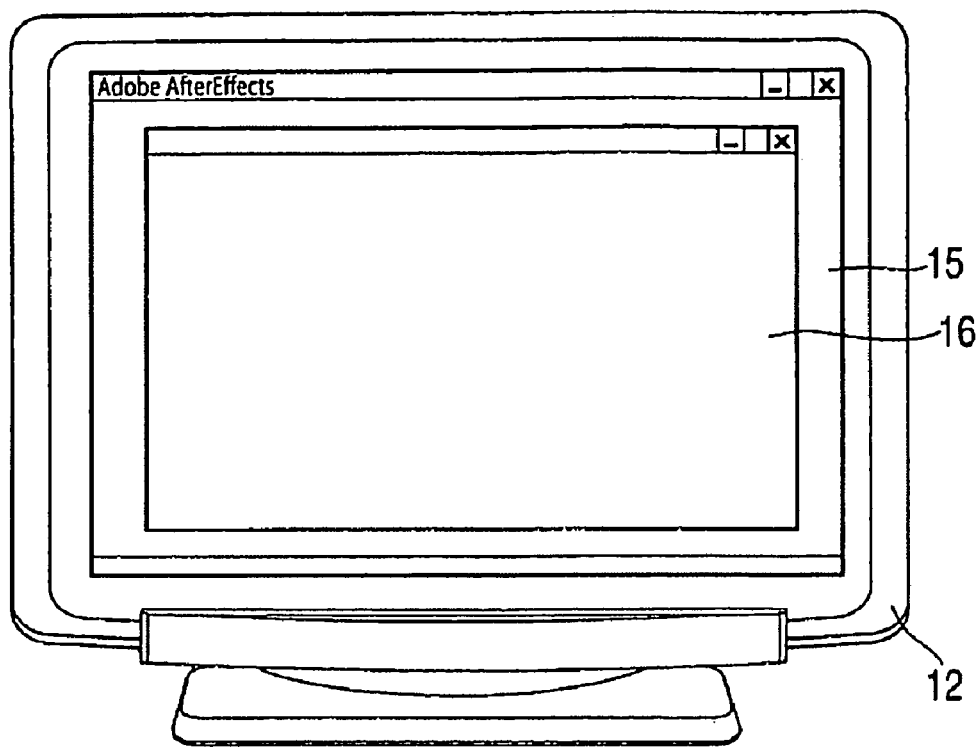
FIG. 2A is a view of the computer monitor of FIG. 1 displaying a video compositing application having an empty white composition window opened.
Figure 2B:
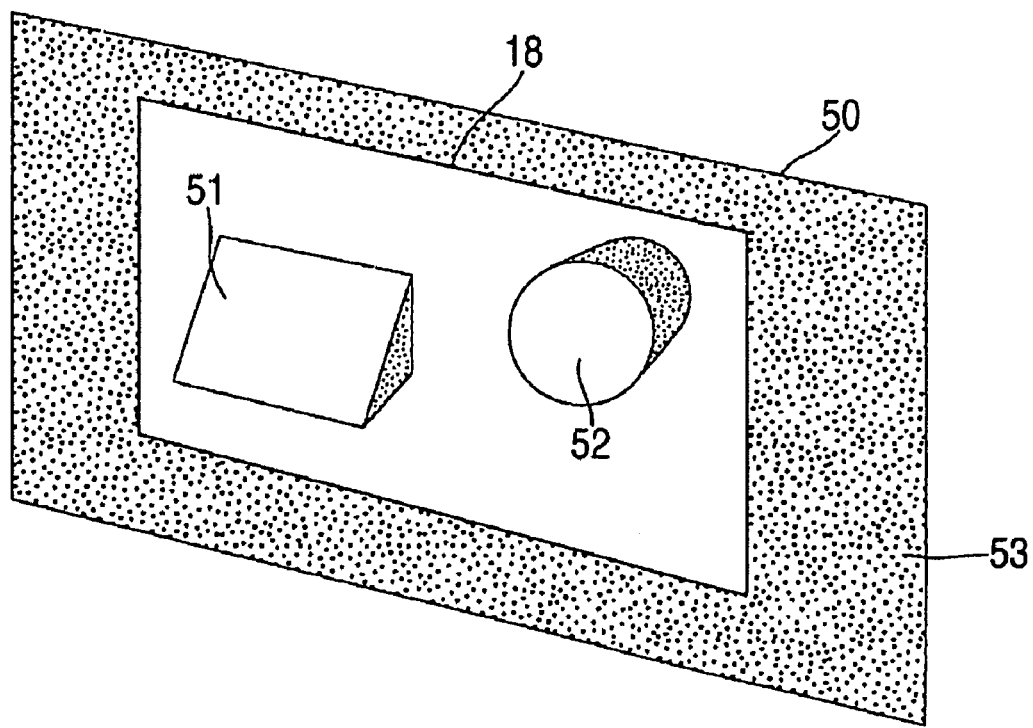
FIG. 2B is a perspective view of the architecture of FIG. 1 having the empty white video composition window of FIG. 2A projected thereon.

Referring now to FIGS. 2A and 2B, once the projector device 30 is "locked-down" and the image projection system 100 is set up, the user activates/opens the Adobe® After Effects® application 15 on the laptop computer 10. All user commands on the laptop computer 10 are inputted via traditional input means, such as a mouse, keyboard, etc All of Adobe After Effects' software applications, tools, and controls are performed by selecting and executing the proper commands within the various interfaces, toolbars, menus, icons, etc of the Adobe® After Effects® application. Those skilled in the art will appreciate that software applications that are equivalent to Adobe® After Effects® can be used, and that such applications will often refer to functions and interfaces that are equivalent to those described herein by different names.

Once the Adobe® After Effects® application 15 is opened, the user opens a composition window 16. Because the laptop computer 10 is operably coupled to the video projector 30, activating a "line video preview" command will project the contents of the composition window 16 onto the architecture 50 in real time (as shown in FIG. 2B). Thus, changing the content of the composition window 16 will result in corresponding changes to the imagery being projected onto the architecture 50. When initially opened, the composition window 16 is empty and white. Thus, the white composition window 16 is projected onto the architecture 50 as a white rectangular area 18, as illustrated in FIG. 2B.

The white rectangular area 18 covers the rectangular surface 51, the circular surface 52, and a portion of the flat surface 53. The surfaces (or portions thereof) of the architecture 50 that are not being projected onto are shaded gray throughout this application. If desired, and if necessary to capture all of the desired surfaces of the architecture 50, the size of the white rectangular area 18 can be increased by increasing the distance between the architecture 50 and the video projector 30.

Figure 3A:
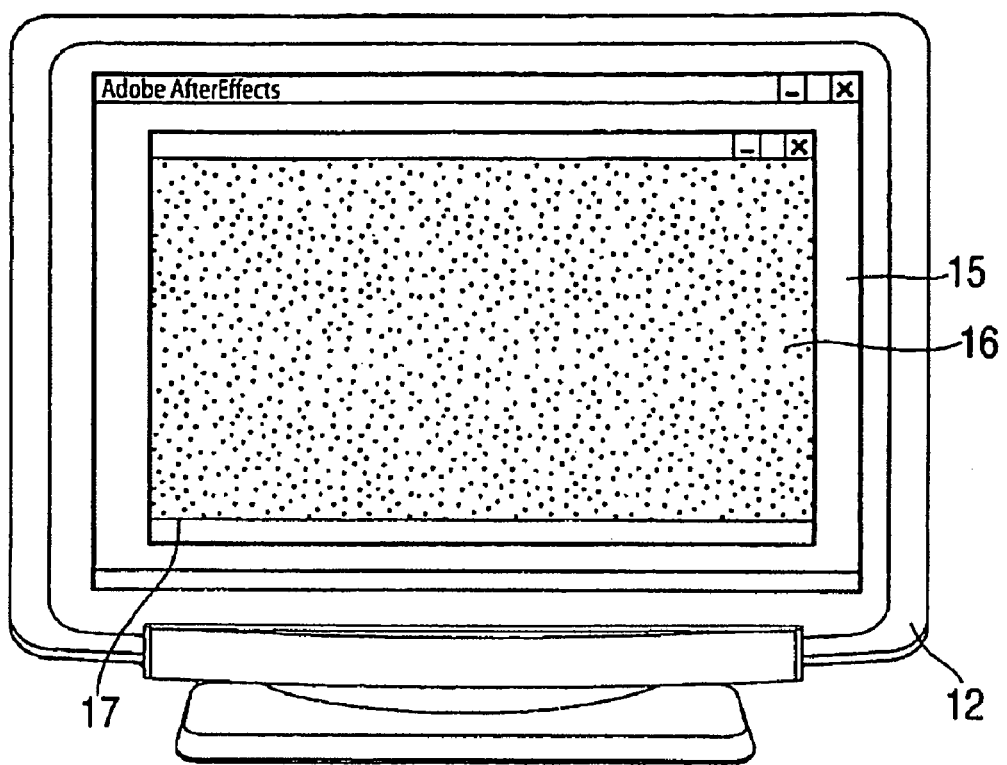
FIG. 3A is a view of the composition window having a black masking background applied.
Figure 3B:
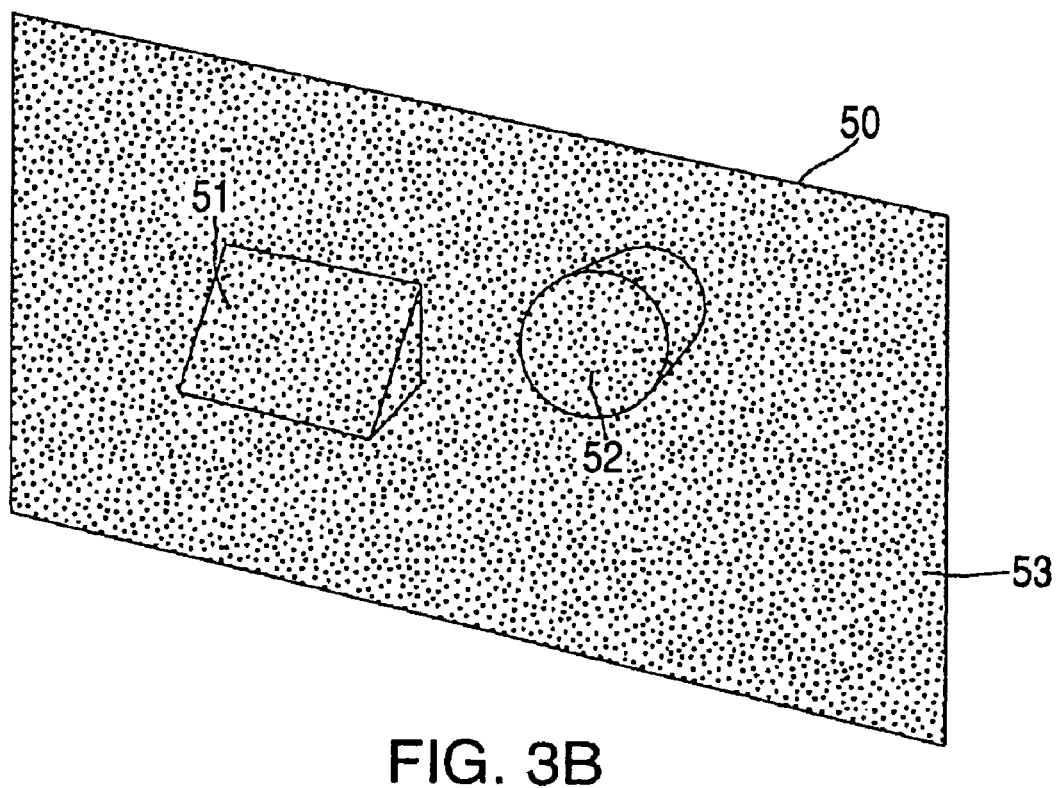
FIG. 3B is a perspective view of the architecture of FIG. 1 having the contents of the video composition window of FIG. 3A projected thereon.

Referring now to FIGS. 3A and 3B, once the composition window 16 is opened and it is determined that the projection of the blank window 16 fully covers the desired surfaces of the architecture 50, a black masking background layer 17 is applied to the composition window 16. The application of the black masking background layer 17 creates the illusion of an absent video projector/feed. In other words, the negative space is projected as black and it appears as though there is no projection onto the architecture 50, as exemplified in FIG. 3B. The higher the contrast ratio of the projector, the more convincing the illusion appears to be. This technique breaks the bounds of traditional video that is confined to the 3:4 aspect ratio.

Figure 4A:
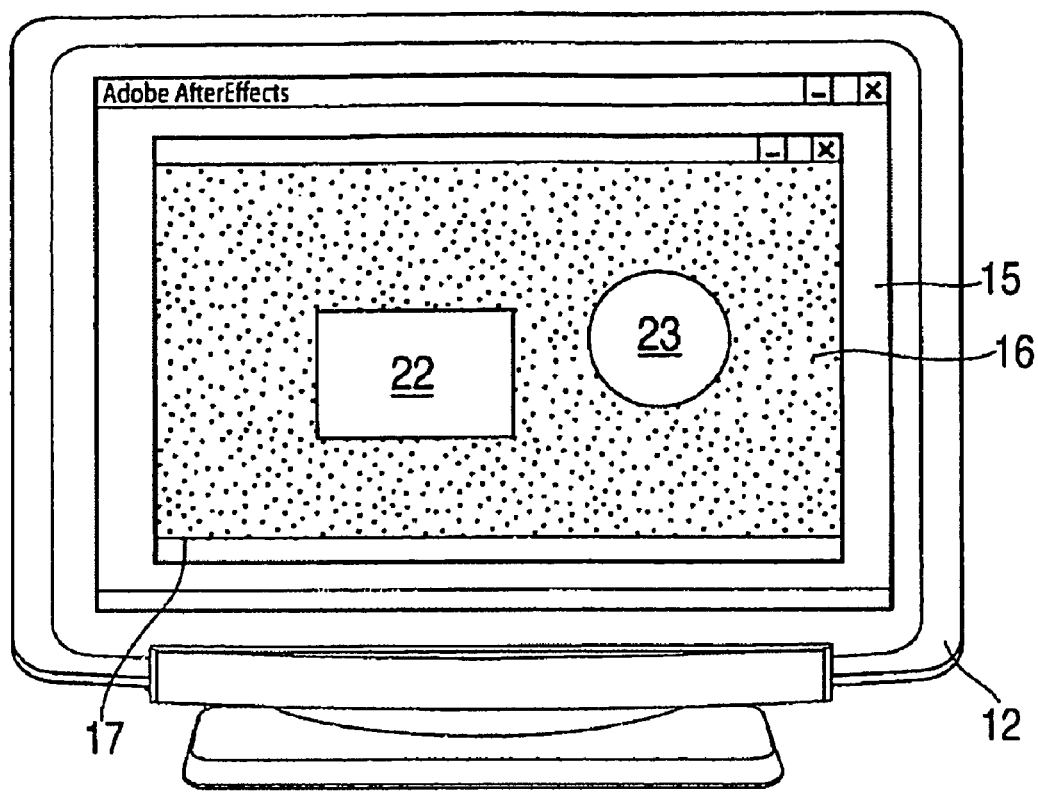
FIG. 4A is a view of the composition window having a blank rectangular matte and a blank circular matte inserted atop the black masking background.
Figure 4B:
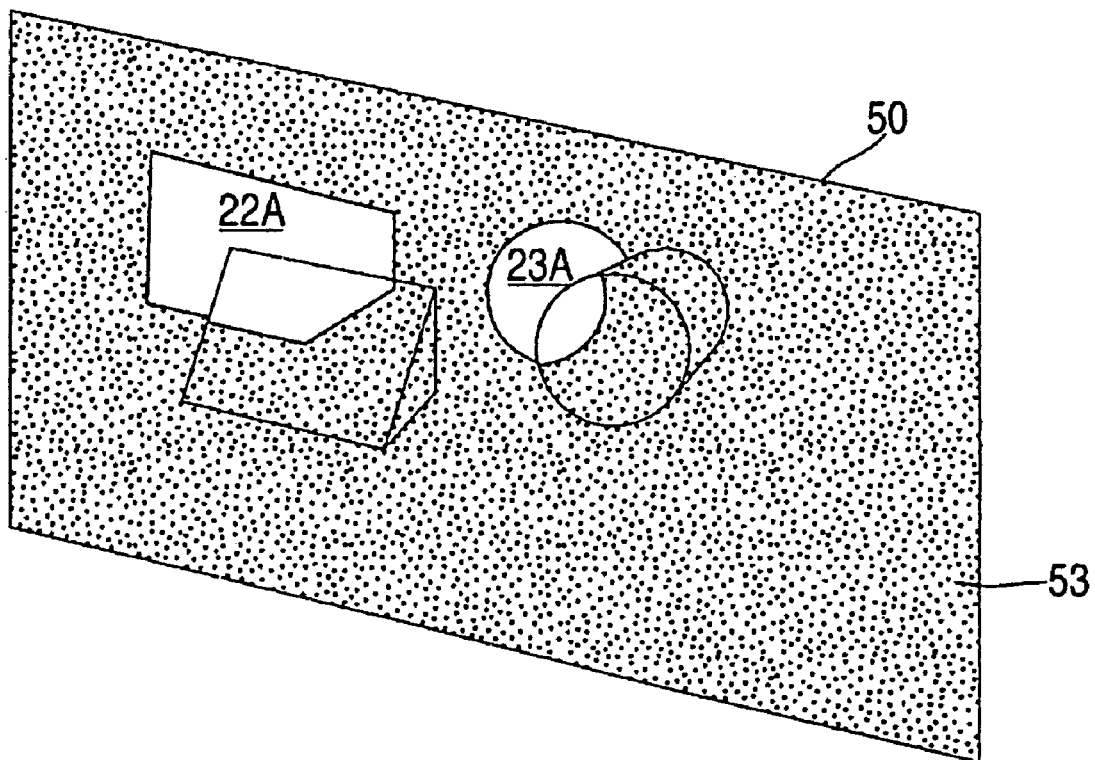
FIG. 4B is a perspective view of the architecture of FIG. 1 having the contents of the video composition window of FIG. 4A projected thereon, wherein the projected images of the blank mattes are not aligned with the desired surfaces of the wall and experience substantial optical distortion.
Figure 5A:
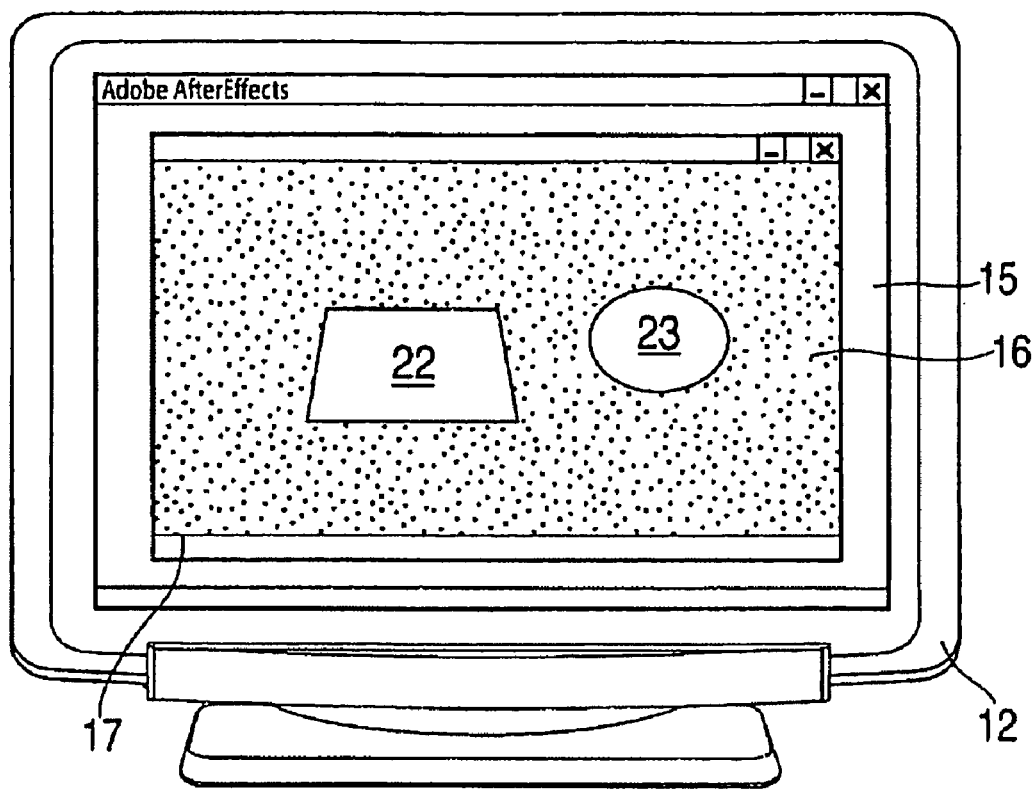
FIG. 5A is a view of the composition window wherein the shape and position of the blank rectangular matte and the blank circular matte have been adjusted so that the projected images of the blank mattes are aligned with and overly the desired surfaces of the wall.
Figure 5B:
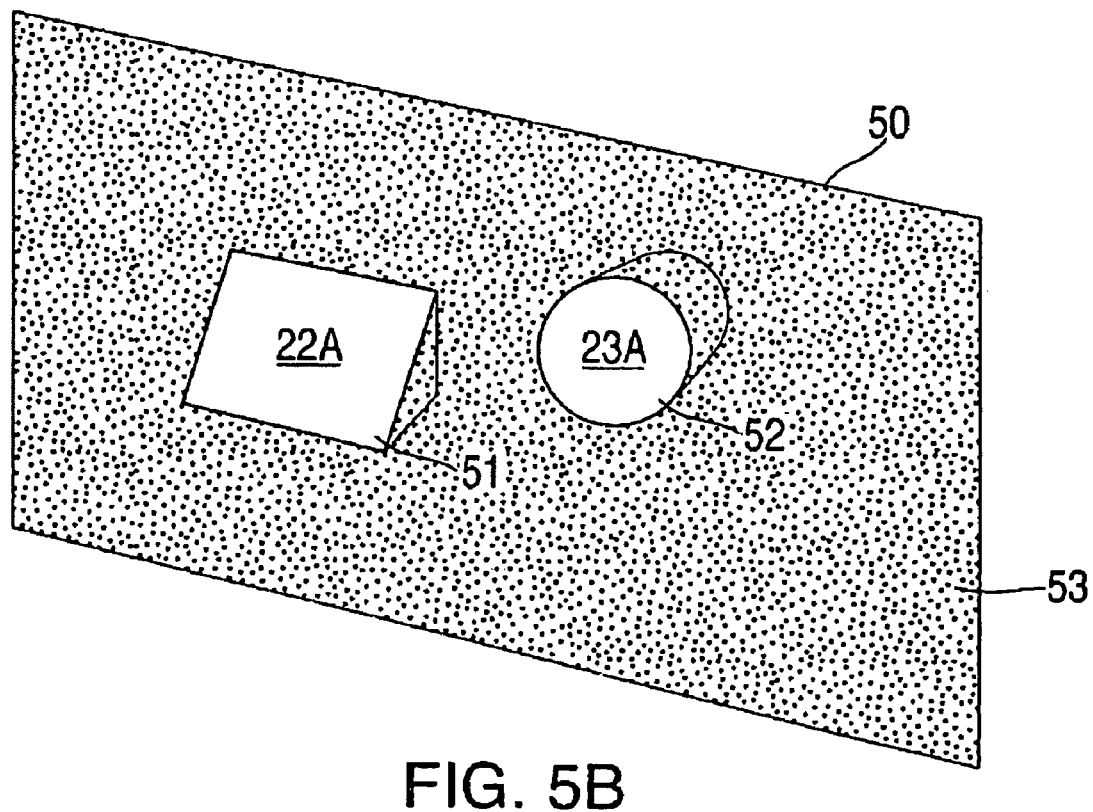
FIG. 5B is a perspective view of the architecture of FIG. 1 having the contents of the video composition window of FIG. 5A projected thereon.

Referring now to FIGS. 4A and 4B, once the black masking background layer 17 is applied to the composition window 16, a blank rectangular matte 22 and a blank circular matte 23 are inserted into the composition window 16 atop the black masking background layer 17, thereby completing step 935 of FIG. 9. The user may insert these mattes 22, 23 into the composition window 16 through a video projection function, or similar function of the software application. The shape, size, and position of the blank mattes 22, 23 in the composition window 16 are roughly approximated to correspond to the shape, size, and location of the surfaces of the architecture 50 on which it is desired to project imagery content. For this example, the desired surfaces of the architecture 50 are the rectangular surface 51 and the circular surface 52 respectively.

As shown in FIG. 3B, images of the blank mattes 22, 23 are projected onto the architecture 50 as images 22A, 23A respectively in real time. However, because the projection angle of the projector device 30 is not normal to the display surfaces 52, 51, and because the blank mattes 22, 23 are not properly positioned within the composition window 16, the projected images 22A, 23A experience substantial optical distortion.

Referring now to FIGS. 4A and 4B, the user then begins to adjust the size, shape, position, orientation, or any combination thereof of the blank mattes 22, 23 within the composition window 16 so that the projected images 22A, 23A are aligned with and overly the display surfaces 51, 52 respectively. This is done by the user adjusting the edges of the mattes 22, 23 within the composition window 16 and visually observing the real time effect that such adjustments have on the location and orientation of the edges of the projected images 22A, 23A on the architecture 50. This process is continued until all of the edges of the projected images 22A, 23A coincide with the edges of the display surfaces 51, 52 of the architecture 50, thus completing step 940 of FIG. 9. By precisely aligning the edges of the projected images 22A, 23A with the edges of the display surfaces 51, 52, the edges of the projected images 22A, 23A are invisible to a viewer and it appears as if the projected images 22A, 23A perfectly conform to the display surfaces 51, 52. As necessary, software tools such as rotating, scaling, corner pinning, skewing, positioning, or any combination thereof can be used. This procedure is performed for all surfaces of the architecture 50 that are to be projected onto. As necessary, additional blank mattes can be added to the composition window 16 and sized accordingly.

Figure 6A:
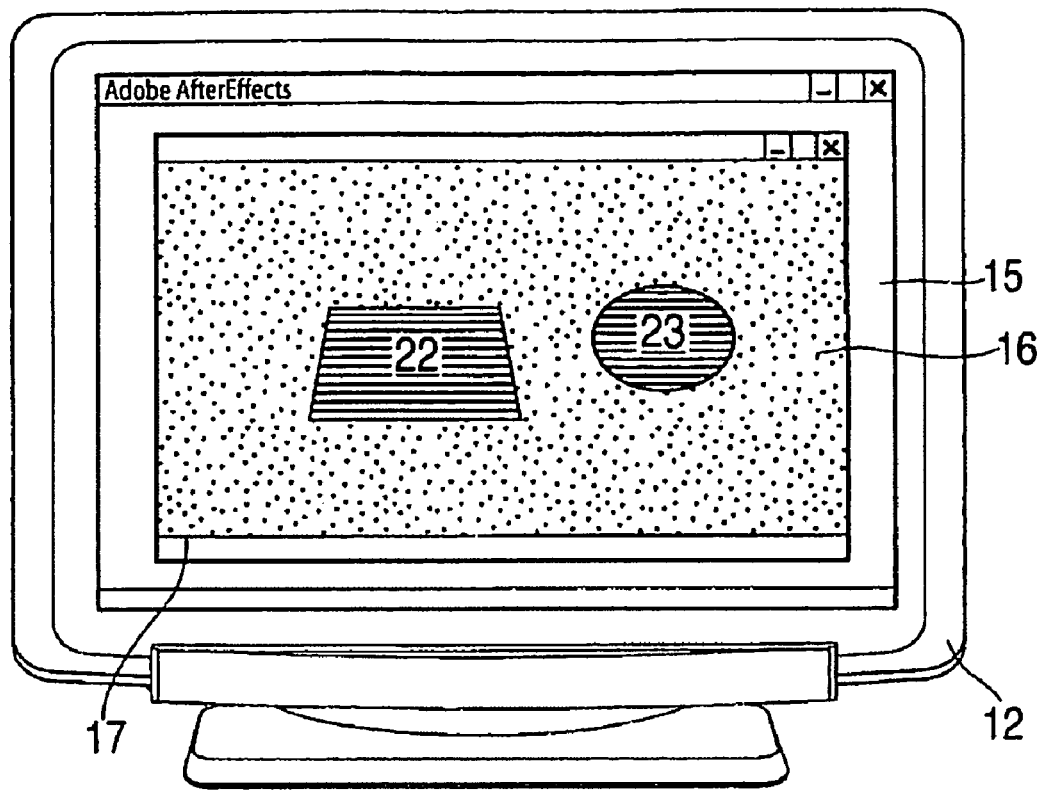
FIG. 6A is a view of the composition window wherein striped imagery has been added to the blank rectangular matte and the blank circular matte.
Figure 6B:
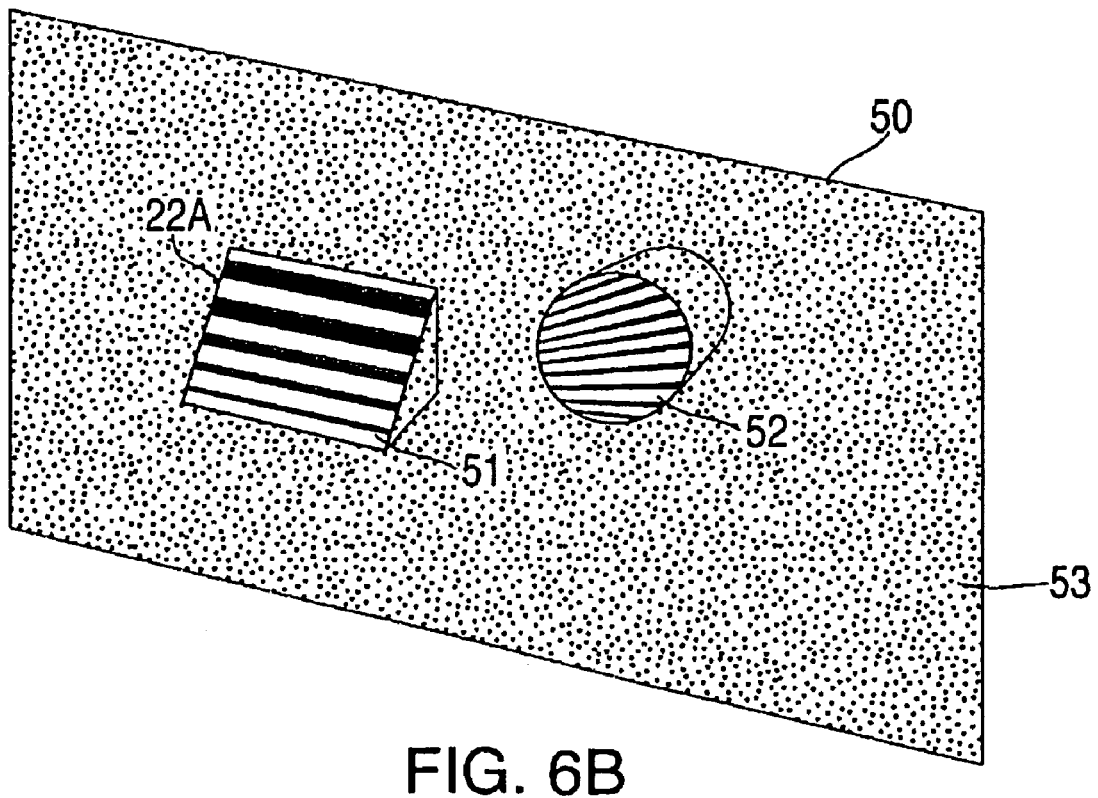
FIG. 6B is a perspective view of the architecture of FIG. 1 having the contents of the video composition window of FIG. 6A projected thereon, wherein the striped imagery of the mattes experience substantial optical distortion.

Referring now to FIGS. 6A and 6B, once all of the necessary blank mattes are inserted into the composition window 16 and properly adjusted so that their projected images are properly aligned with and overlay the desired display surfaces, imagery content is inserted into the mattes 22, 23. In the example, equally spaced horizontal stripes have been added to the mattes 22, 23. While the imagery content is exemplified as simple static stripes, the invention is not so limited The imagery content can include, without limitation, still photographs, video clips, still digital images, streaming digital video, movies, or any other visual content.

Because the projection angle of the projection device 30 is not normal to the non-coplanar and non-adjacent display surfaces 51, 52, the projection of the imagery content on the display surfaces 51, 52 experiences substantial optical distortion (visible in FIG. 6B). While the projection of the imagery content is visibly distorted, it should be noted that the imagery content is still properly aligned with and overlays the display surfaces 51, 52. This is because the projection of the imagery content is limited to the space within the projected images 22A, 23A of the mattes 22, 23, which were sized and oriented in the steps described above.

The optical distortion of the projected imagery content on the display surfaces 51, 52 can be detected by visual inspection. For example, it can be seen that the stripes projected onto the rectangular surface 51 are not of equal width and are not spaced apart equally. Similarly, the stripes projected onto the circular surface 52 are not equally spaces and are diverging. This "skewing" is the result of the display surfaces 51, 52 being angled with respect to the video projection line. In some instances, the optical distortion of the projected imagery content may be visually detected by viewing the architecture 50 as a whole, and evaluating the continuity of the projected imagery content as it appears on the various surfaces 51-53 of the architecture 50.

Figure 7A:
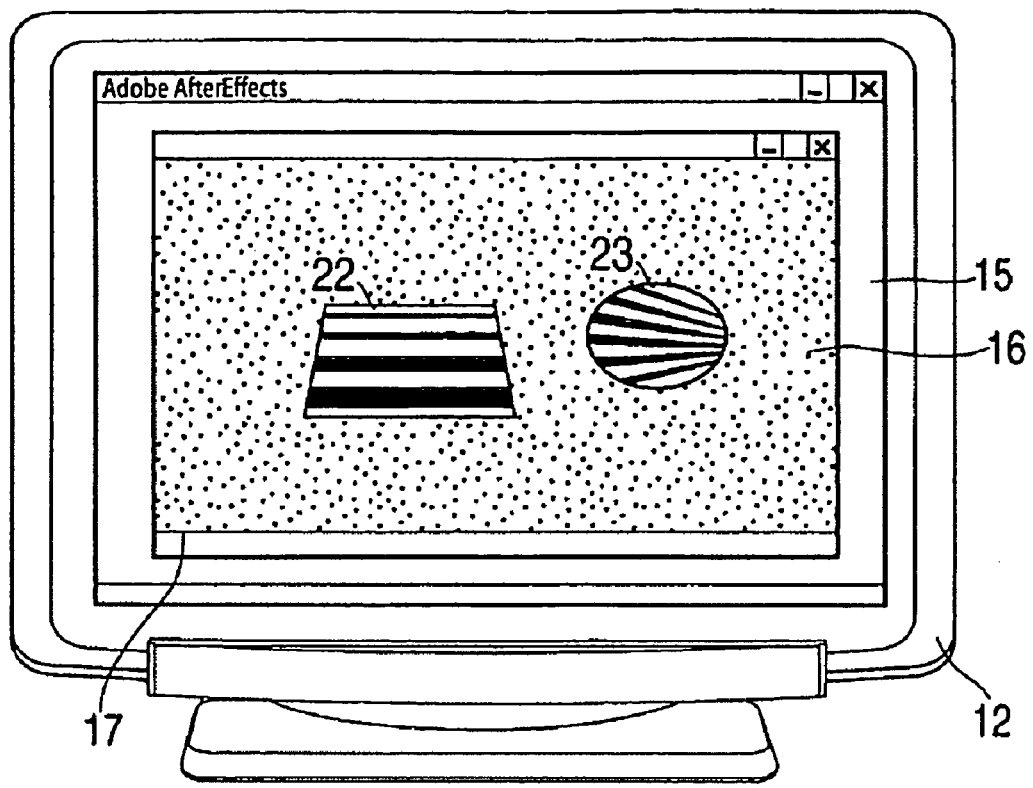
FIG. 7A is a view of the composition window wherein the internal properties of the rectangular and circular mattes have been adjusted so that the projected striped imagery content is not optically distorted.
Figure 7B:
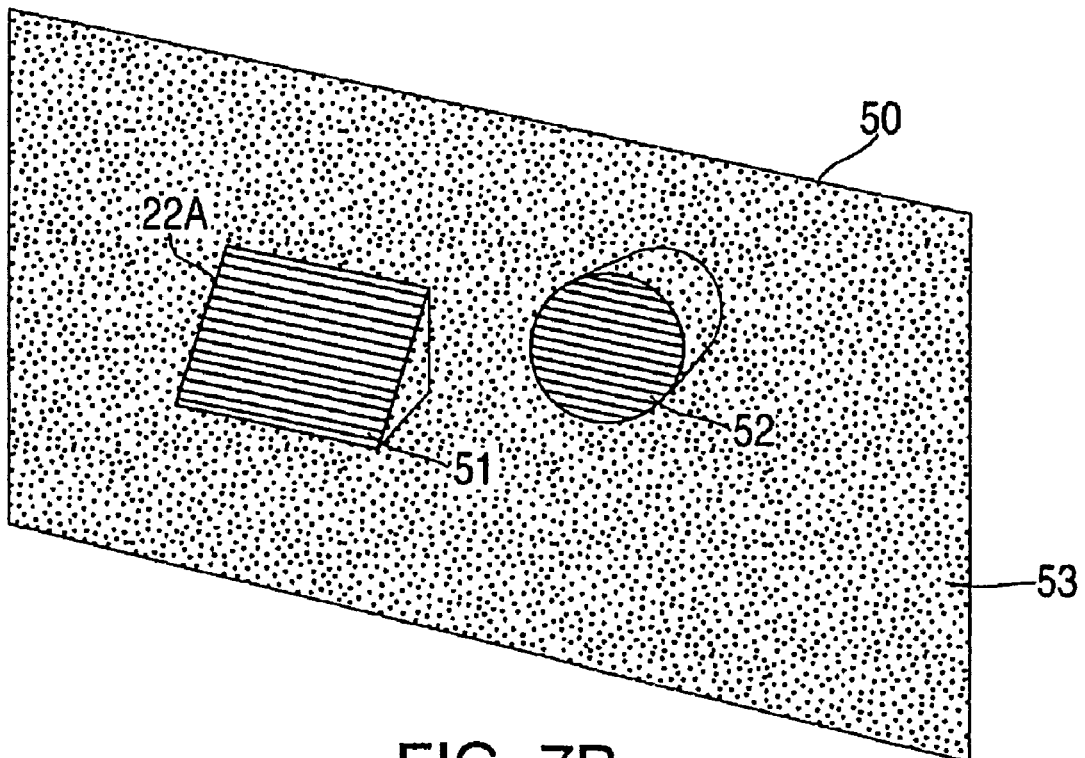
FIG. 7B is a perspective view of the architecture of FIG. 1 having the contents of the video composition window of FIG. 7A projected thereon.

Referring now to FIGS. 7A and 7B, upon the user determining that the projected imagery content is experiencing optical distortion, the user adjusts the internal properties of the mattes 22, 23 to compensate for the optical distortion. This is done by using tools within the video compositing application, including, without limitation, rotating, scaling, corner pinning, general positioning, skewing, or any combination thereof. Adjusting the internal properties of the mattes 22, 23 results in a corresponding change in how the imagery content is projected onto the display surfaces 51, 52 in real time. As mentioned above, this is made possible by using the live video preview function of the video compositing application. Such correction would be especially effective when utilizing text imagery in the projections.

As the user adjust the internal properties of the mattes 22, 23, he/she visually observes the effect that such adjustments have on the resulting projection of the imagery content on the display surfaces 51, 52. The user continues to adjust the properties of the mattes 22, 23 until the optical distortion of the projected imagery content on the display surfaces 51, 52 is minimized and/or eliminated. As can be seen by comparing FIGS. 7A and 7B, despite the striped imagery content appearing distorted in the mattes 22, 23 of the composition window 16, the projection of the striped imagery content within the images 22A, 23A on the display surfaces 51, 52 appears undistorted. This completes step 945 of FIG. 9.

This completes the mapping procedure. The general layout of the composition window 16 (i.e. the map), including the matte coordinates and the internal properties of each matte can then be saved for future use. The user can then utilize the saved map in the future to insert any piece of imagery content and/or change the imagery content as desired. As a result, the user can easily change the imagery content to be projected onto the architecture 50 without having to go through the mapping procedure by simply inserting new imagery content into the mattes. The internal matte properties will automatically be applied to the new imagery content.

Once the map and desired imagery content is inserted into the mattes 22, 23, a loop is designed and rendered within the video compositing application to effectuate continuous play of the imagery content. The content of the composition window 16, including the looped imagery content, is compressed, e.g., in a mpeg-2 format, and then burned onto a DVD, thereby completing step 950 of FIG. 9.

Referring now to FIG. 8, the laptop 10 and A/V converter 20 are then disconnected, and a DVD player 40 is operably connected to the video projector 30, completing step 955 of FIG. 9. The DVD on which the video clip was saved is then inserted into the DVD player 40 and played. The imagery content of the composition window 16 is retrieved from the DVD and projected onto the architecture 50 in a looped fashion via the video projector 30, completing step 960. While a DVD player 40 is illustrated as the video playback device, the invention is not so limited. Other electronic devices can be used to playback the stored imagery content of the composition window, including for example, solid state playback devices, personal computers, or the like. Furthermore, the storage of the video clip is not limited to a DVD) but can be stored on any memory medium, including hard disks, zip drives, USB storage devices, etc.

As yet another illustration of an embodiment of the present invention, a user is capable of incorporating the previous application of the masking process into the metal surfaces or cells (i.e., discernible portions of walls, ceiling, floors and general surfaces). Where masking, or use of black, is the major effect needed, e.g., the user does not want to project on the mirrors or elements other than specific surfaces such as metal surfaces, white surfaces, etc. A user would then utilize a video compositing application or a similar program to create video maps that were black and white, black where there is to be no imagery and white where there is to be video and imagery.

Unlike conventional video projection devices that employ "keystone" distortion correction techniques, "lens-shifting" techniques, or similar distortion correcting techniques, the present invention can compensate for multiple instances of distortion on multiple non-coplanar and non-contiguous surfaces within a three-dimensional area. In addition, the present invention can create a masking effect, which creates the illusion of blackness on surfaces upon which the user does not want to project video and images or on areas with no surfaces to project upon, Projection Kit and Content Projection Method Referring now to FIG. 10-17 generally, an image projection kit will be discussed and described in detail according to exemplary embodiments of the present invention. However, it is to be understood that the concepts discussed above can be incorporated therein as necessary and/or desired.

Figure 10:
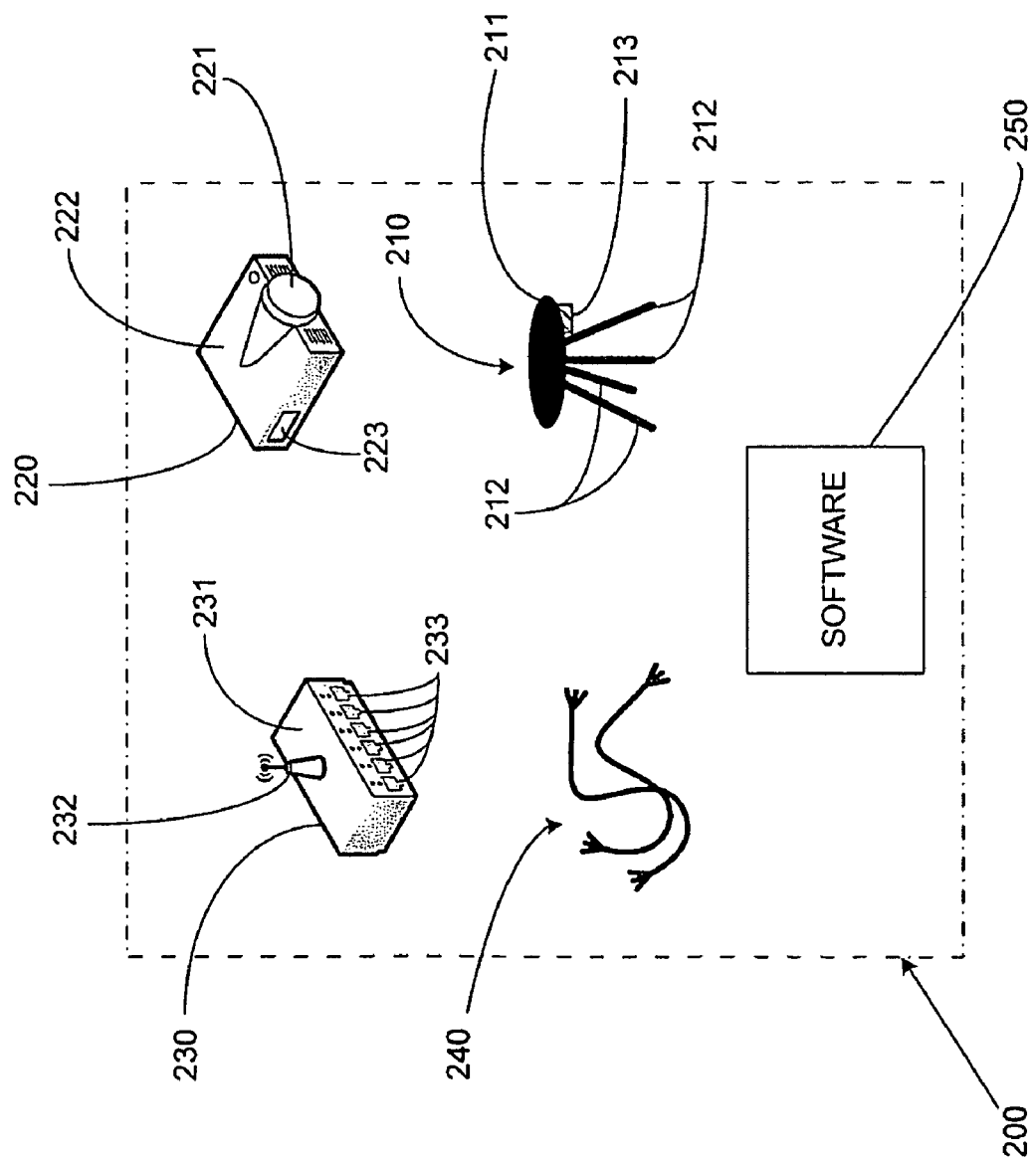
FIG. 10 is a schematic of an image projection kit according to an embodiment of the present invention.

Referring to FIG. 10, an image projection kit 200 is illustrated according to one embodiment of the present invention. The image projection kit 200 generally comprises a projector mounting mechanism 210, a projector apparatus 220, a control unit 230, data transmission and power cables 240 and video compositing software 250. The image projection kit 200 is designed to be sold as an a integrated retail product kit with all components housed in a single box at the point of purchase. Of course, one or more of the components could be replaced, combined and/or omitted if desired.

The projector mounting mechanism 210 is provided to facilitate mounting of the projector apparatus 220 to a desired surface and/or structure at a user's site, such as an apartment, home, condominium, outdoor area, etc. The mounting mechanism 210 generally comprises four members 212 and a plate 211 to which the projector apparatus 220 can be fastened, for example by bolts, screws, clamps, adhesives, hook-and-loop tape, double-sided tape, slide-fit assemblies, snap-fit assemblies, etc. The members 212 comprise holes near their bottoms to facilitate rigid connection to the desired surface and/or structure at the user's site via screws, bolts or other fasteners. Of course, the members 212 could incorporate other connection mechanisms, such as flanges, clamps, adhesives, hook-and-loop tape, double-sided tape, slide-fit assemblies, snap-fit assemblies, etc. If desired, the member 212 could be merely adapted to rest atop a surface.

The plate 211 is pivotally mounted to the members 212 so that the projector apparatus 220 can be swiveled to the desired orientation even when the member 212 are rigidly secured in place. The projector mounting mechanism 210 also preferably comprises a locking mechanism 213 (generically illustrated). The locking mechanism 213 can be activated to secure the projector apparatus 220 in a fixed orientation so as to prohibit unwanted movement once the projector apparatus 220 is properly oriented and mounted by the mounting mechanism 210. The locking mechanism 213 can take on a wide variety of structural arrangements, including interlocking flanges, a slide-bar assembly, tangs, compression assemblies, frictional engagement, etc.

While the mounting mechanism 210 is illustrated as a separate structure than the projector apparatus 220, it is to be understood that the components could be combined so that the mounting mechanism 210 and the projector apparatus 220 are an integral or fastened together component.

Moreover, the projector mounting mechanism 210 is illustrated as being a "quadpod" style structure for, merely exemplary purposes. It is to be understood that the mounting mechanism 210 can take on a wide variety of structural arrangements. For example, the mounting mechanism 210 could be merely a flange or any other combination of beams and/or plates.

The projector apparatus 220 is a device that has both image projection and image capture capabilities, both of which are facilitated from the same point of view, which in this case is through lens 221. The projector apparatus 220 comprises a housing 222, a lens 221, and a communication port 223 for receiving and/or sending data signals. The structure and operation of the projector apparatus 220 will be discussed in greater detail below with respect to FIG. 11.

Figure 19:
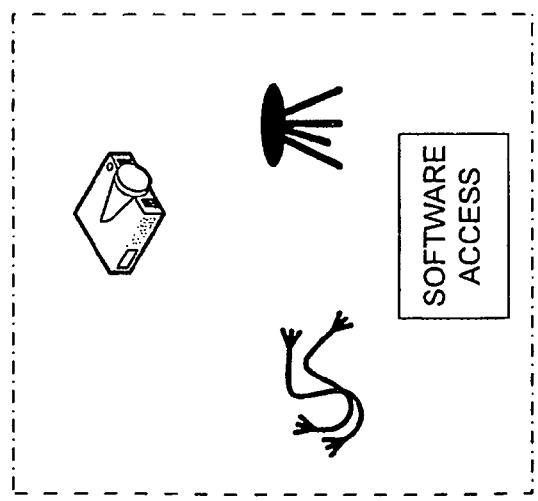
FIG. 19 is a schematic of an alternative embodiment of an image projection kit wherein the control unit is omitted according to the present invention.

The control unit 230 is a preferably stand-alone component that acts as the head unit for the image projection kit 200. Of course, as shown in FIG. 19, the functions and structure of the control unit 230 can be integrated into the projector apparatus 220 and/or the user's computer as hardware and/or software. Generally, the control unit 230 comprises a housing 231, a transceiver 232, and a plurality of data ports and/or memory slots 233.

The control unit 230 preferably supports the following functionality: (i) wireless/tethered video signal connectivity to the projector apparatus 220; (ii) wireless/tethered serial control of the projector apparatus 220 (e.g., On/off, diagnostics, etc.); (iii) wireless/tethered online/network capabilities; (iv) memory expansion; (iv) enhanced video processing capabilities (i.e., the control unit 230 preferably does all the "heavy lifting" when it comes to processing and compiling the video compositions); (v) built in custom software for mapping and playback; and (vi) control over built in image capture sub-system of the projector apparatus 220.

The necessary cables 240 are also included with the image projection kit 200. The cables 240 can include the power cables and data communication cables necessary to connect the components of the system 200. Examples of such cables include without limitation, firewires, USB cables, mini-USB cables, HDMI cables, fiber-optic cables, etc. Of course, if desired, all data communication can be achieved through wireless means such as RF, IR, etc.

Finally, the image projection kit 200 comprises a software package 250. The software package is a video compositing software application. One example of a video compositing application suitable for use with the present invention is Adobe® After Effects®. Most preferably, a customized software package is used that can achieve the functions and render the interfaces described throughout the present patent application. The software package 250 can be included in the kit 200 on a computer readable medium, such as a flash drive, CD-ROM, or other external memory source. In another embodiment, the software package 250 can be included in the kit 200 as an alphanumeric, numeric, alphabetic or other code that allows users to access and download the software onto their computers from a wide area network ("WAN"), such as the Internet. Of course, other purchase verification means can be used. In some embodiments, the software package 250 may even be supplied free of charge to users to promote the kit 200.

Figure 11:
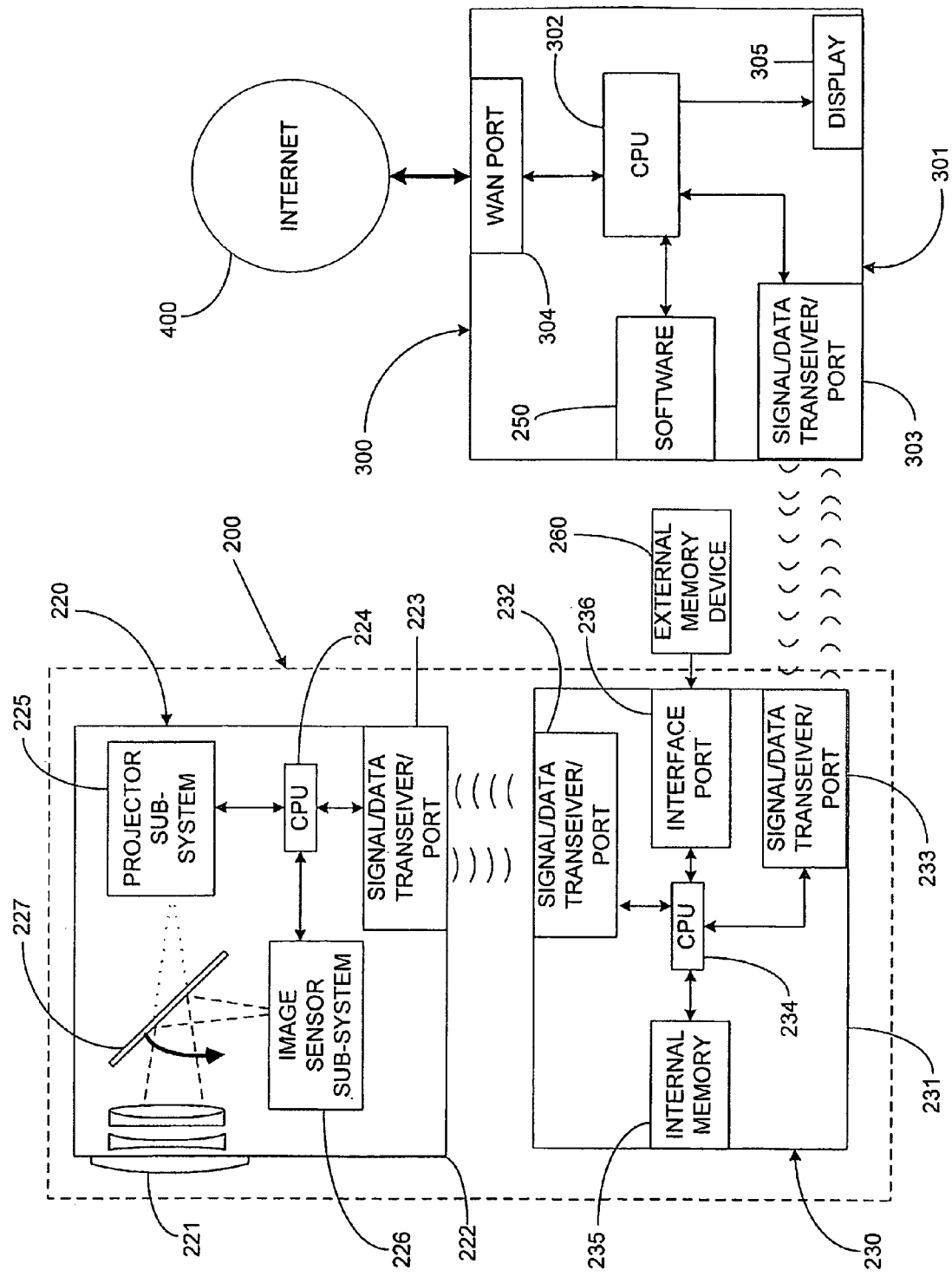
FIG. 11 is a schematic of an image projection system utilizing the image projection kit of FIG. 10 according to an embodiment of the present invention.

Referring now to FIG. 11, the general functional capabilities and component interaction of the image projection kit 200 when installed on a computer 300 will be described. Beginning with the projector apparatus 220, the housing 222 of the projector apparatus 220 contains all of the necessary electrical, mechanical and circuitry components so that the projector apparatus 220 has both image projection, image capture and data transmission and reception capabilities. Generally, the projector apparatus 220 comprises a projector sub-system 225, an image sensor sub-system 226, a single lens reflex assembly (which comprises the lens 221 and a pivotable mirror 227), a processor 224 ("CPU") and a plurality of signal/data ports 223. All of the components are operably and communicably connected to one another via a bus or other means.

The projector sub-system 225 comprises all of the circuitry and mechanical components necessary to project imagery content, such as videos or still content, onto the desired real-world architecture of a user's site, such as a wall, post, ceiling or floors. A detailed explanation of the projector sub-system 225 is not necessary as projectors systems are well known in the art. Similarly, the image sensor sub-system 226 comprises all of the circuitry and mechanical components necessary to sense and transmit a real-world image perceived by the lens 221 as data for recreation on a display device 305 of a the computer 300. A detailed explanation of the image sensor sub-system 226 is not necessary as such systems are well known in the art and are commonly used in digital cameras. It should also be appreciated that in some embodiments of the invention, portions of the image sensor sub-system 226 and the projector sub-system 225 can be combined to minimize circuitry and size of the overall device.

The projector apparatus 220 can switch between an image projection mode and an image capture mode by manipulation of the pivotable mirror 227. When in the image capture mode, the image sensor sub-system 226 is active and the projector sub-system 225 is inactive. On the other hand, when in the projection mode, the image sensor sub-system 226 is inactive and the projector sub-system 225 is active.

More specifically, when the CPU 224 receives an image sensor activation signal from the control unit 230 (or computer 300) via the data port 223, the CPU 224 rotates the mirror 227 (if necessary) so that it is at the illustrated 45 degree angle. As a result, the image sensor sub-system 226 is in operable optical alignment with the lens 221 and can thereby perceive the real world image seen by the lens 221. At this time, the projector sub-system 225 is blocked by the back surface of the mirror 227 and is preferably turned off. However, when the CPU 224 receives a projection activation signal from the control unit 230 (or computer 300) via the data port 223, the CPU 224 rotates the mirror 227 (if necessary) 45 degrees downward so that the mirror 227 does not obstruct the line of sight from the lens 221 to the projector sub-system 225. Thus, the projector sub-system 225 is in operable optical alignment with and can project imagery through the lens 221. At this time, the image sensor sub-system 226 is blocked by the mirror 227 and is preferably turned off. Through the use of the aforementioned single-reflex lens assembly, the projector apparatus 220 can both capture an image of the desired architecture on the computer for mapping and later project images onto this architecture from the same point of view.

The control unit 230 comprises a processor 234 ("CPU"), a transceiver 232, an internal memory 235, an interface port 236, and a data port 233. All of these components are in operable and communicable cooperation with one another inside of the housing 231. The control unit 230 communicates with the projector apparatus 220 via the transceiver 232 and with the user's computer 300 via the data port 233. Of course, a single or multiple wired or wireless ports can be used for all data communication between the projector apparatus 220, the control unit 230 and/or the computer 300. Any kind of data communication port can be used, including HDMI, IR, RF, USB, mini-USB, firewire, etc.

The CPU 234 is a properly programmed processor capable of performing the necessary functions described herein and above as functions (i)-(vi). The interface port 236 operably receives an external memory device 260, which can be used to store the mapping and imagery content information created by the user on the computer 300 using the software 250. This data is retrieved from the external memory device 260, processed by the CPU 234 and transmitted to the projector apparatus 220 for appropriate handling. Alternatively (or in addition), the control unit 230 can have an internal memory 235 for storing mapping and imagery content information created by the user on the computer 300 using the software 250. In this embodiment, the computer 300 can transfer this data to the control unit 230 for storage on the internal memory 235 via communication between the respective ports 233 and 303.

The software 250 is loaded onto the computer 300 and executed by the user as described below to create the mapping and imagery content data that is transferred to the control unit 230 (and eventually projected by the projector apparatus 220). The computer stored the software 250 in its internal memory and the user uses the associated interfaces and data files of the video compositing application. As described more fully below, the computer 300 can be connected to the Internet 400 to connect to a video content provider in order to purchase and download video projection clips (i.e., video data files) for projection on their architecture.

Referring now to FIGS. 12-17B, the installation and operation of the image projection kit 200 at an end user's site will be described more fully. It is to be understood that the mapping and setup techniques discussed above in relation to FIG. 1-9 can be implemented in addition to or instead of the below technique. It is also to be understood that the exact sequence of the installation and setup process discussed below are not limiting of the invention and can be done in any order.

Figure 12:
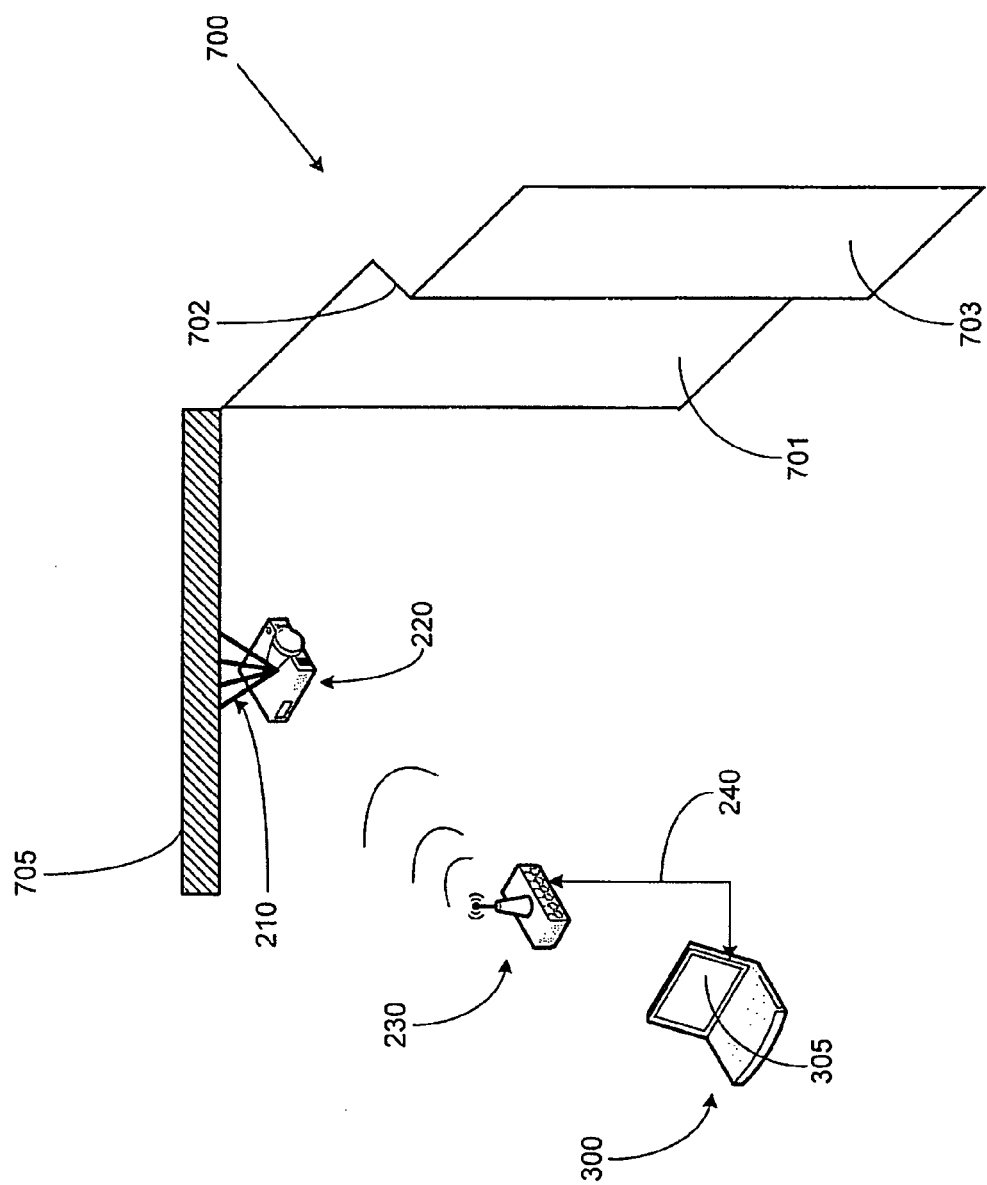
FIG. 12 is an illustration of the an image projection system of FIG. 11 installed at a user's site according to an embodiment of the present invention.

Beginning with FIG. 12, once the user purchases the image projection kit 200, the user identifies the architecture 700 on which he/she wants to project imagery content, such as videos, still imagery, photographs, etc. In the exemplary embodiment, the selected architecture 700 is a three dimensional architecture consisting of three non-coplanar wall surfaces 701-703. The projector apparatus 220 is pivotally connected to the mounting mechanism 210 and the combined assembly is then rigidly secured to a desired support structure 705 that affords a line of sight to the surfaces 701-703 of the architecture 700. At this time, the projector apparatus 220 can still pivot and/or translate relative to the base portion of the mounting mechanism 210 so that the orientation of the projector apparatus 220 can be adjusted.

The software 250 is then loaded onto the computer 300, which in this embodiment is a laptop computer. As used herein, a computer can be any electronic device (or combination of devices) having a display and the processing capabilities necessary to execute the software 250 and performing the necessary data communication, transfer and/or storage. For example, and without limitation, the computer 300 can be a television, a set-top cable box, a video game system, the control unit 200 and/or combinations thereof.

The software 250 can be loaded onto the computer 300 via a computer readable medium or downloading through a WAN. All of the necessary power and data communication cables 240 are then installed so that the computer 300, the control unit 230 and the projector apparatus 250 are powered and communicate with one another, as established in FIG. 11. Of course, (or wireless communication paths can be utilized as necessary.

Figure 13A:
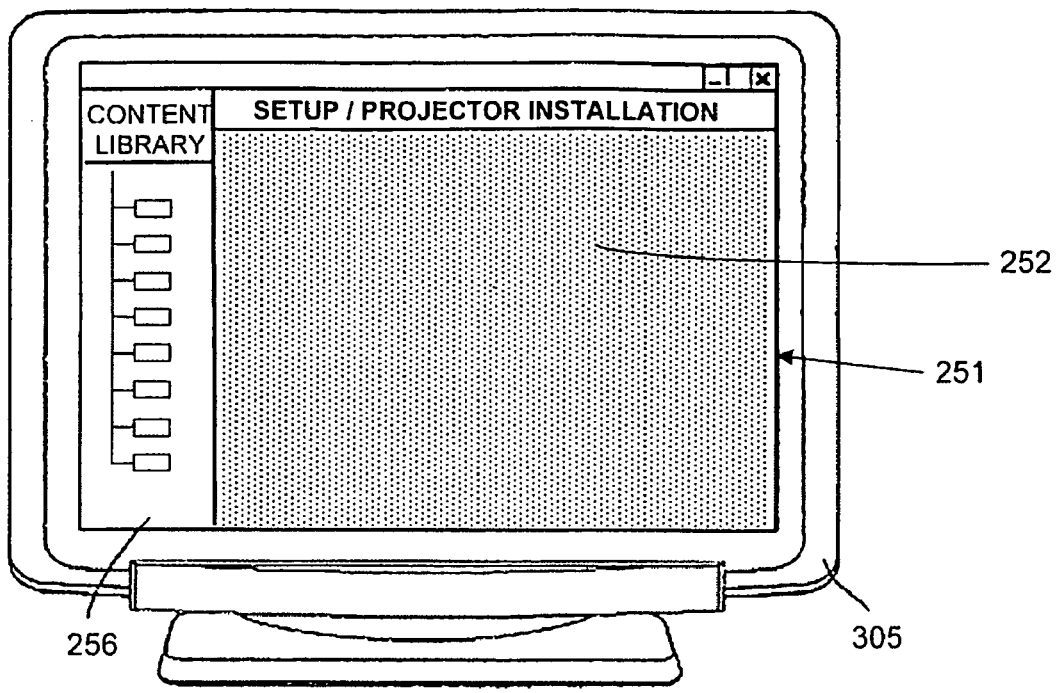
FIG. 13A is an illustration of the computer of the image projection system displaying a video compositing application in projector installation mode.
Figure 13B:
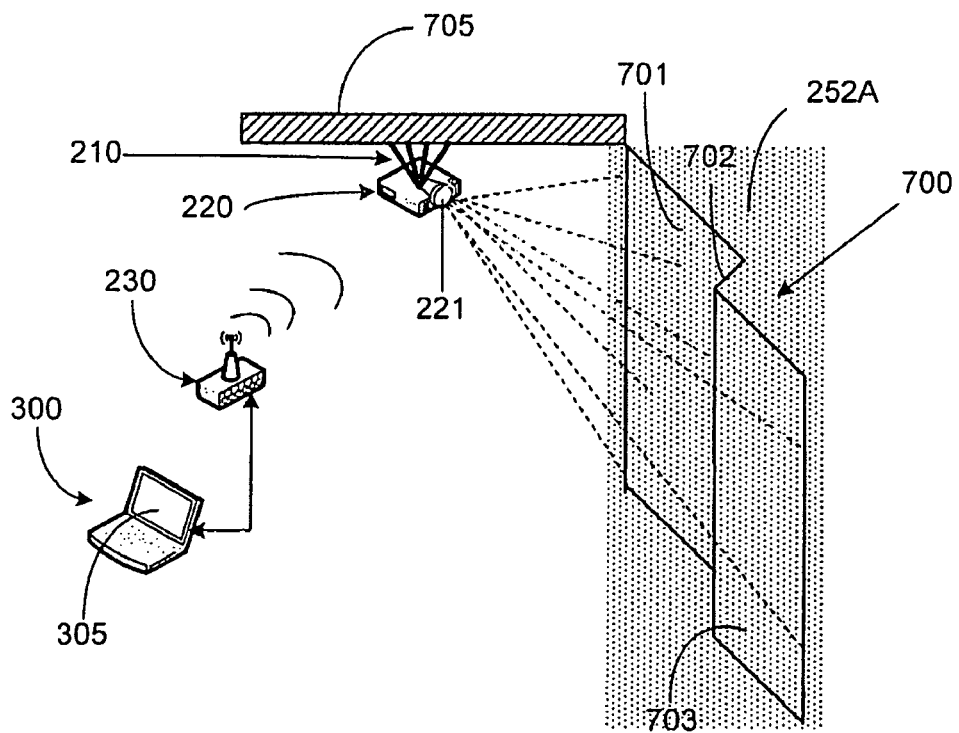
FIG. 13B is an illustration of the user's site wherein the content of the video compositing application of FIG. 13A is projected on the architecture.

Referring now to FIGS. 13A and 13B, once the initial hardware and software installation is complete, the user sets the control unit 230 to a setup mode. This can be done by having a manual switch on the control unit or can be done through the software 250 (i.e., the video compositing software) installed on the computer 300. The user launches the software 250 on the computer via conventional techniques. The user then enters/launches a setup/projector installation interface 251 through the appropriate menu. The window of the setup/projector installation interface 251 is filled with an aiming pattern 252. The computer 300 communicates and controls the projector apparatus 220 (via the head unit 230) so that the projector apparatus 220 is switched into projection mode (i.e., the projector sub-system 225 is activated) and an image of the aiming pattern 252A is projected by the projector apparatus 220 through its lens 221. The orientation of the projector apparatus 220 is then manipulated (i.e., pivoted and/or translated) by the user until the image of the aiming pattern 252A covers the desired architecture 700 (or the desired portions thereof). Manipulation of the orientation of the projector apparatus 220 can be manually achieved or remotely achieved through the remote control of built-in servomotors.

Once the image of the aiming pattern 252A is projected in the desired location, the locking mechanism 213 (FIG. 10) of the mounting mechanism 210 is activated, thereby locking the projector apparatus 220 in a fixed orientation, thereby prohibiting unwanted movement.

Figure 14A:
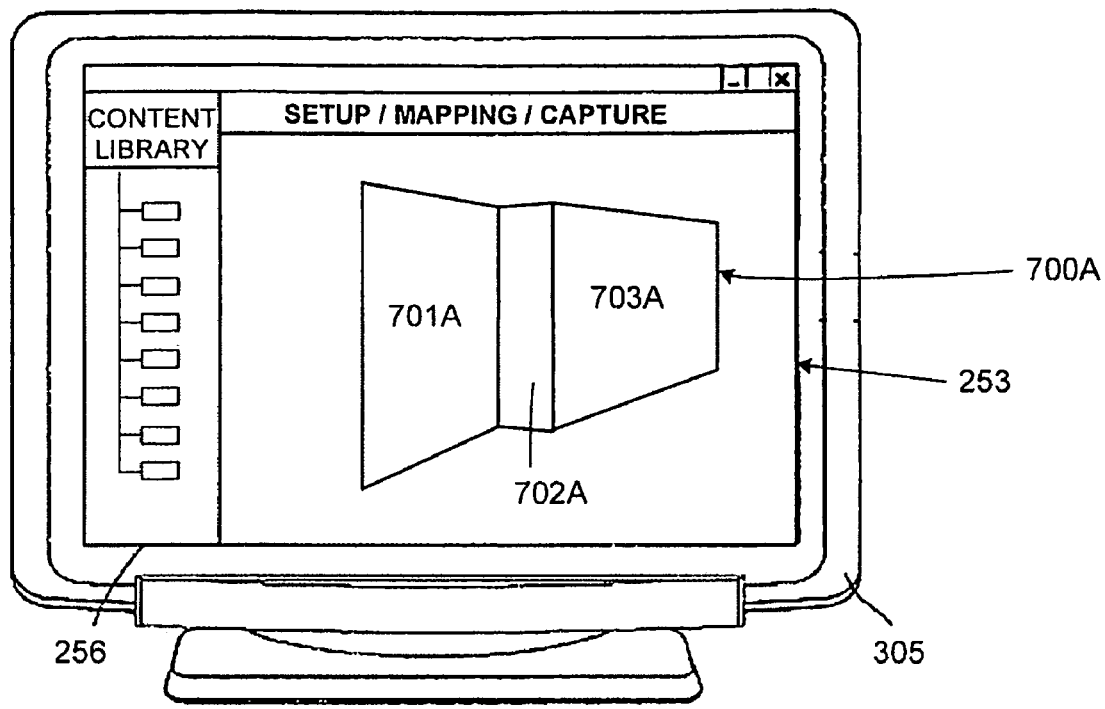
FIG. 14A is an illustration of the computer of the image projection system wherein the video imaging system is in image capture mode, thereby generating a picture of the architecture of the user's site on the video compositing application.
Figure 14B:
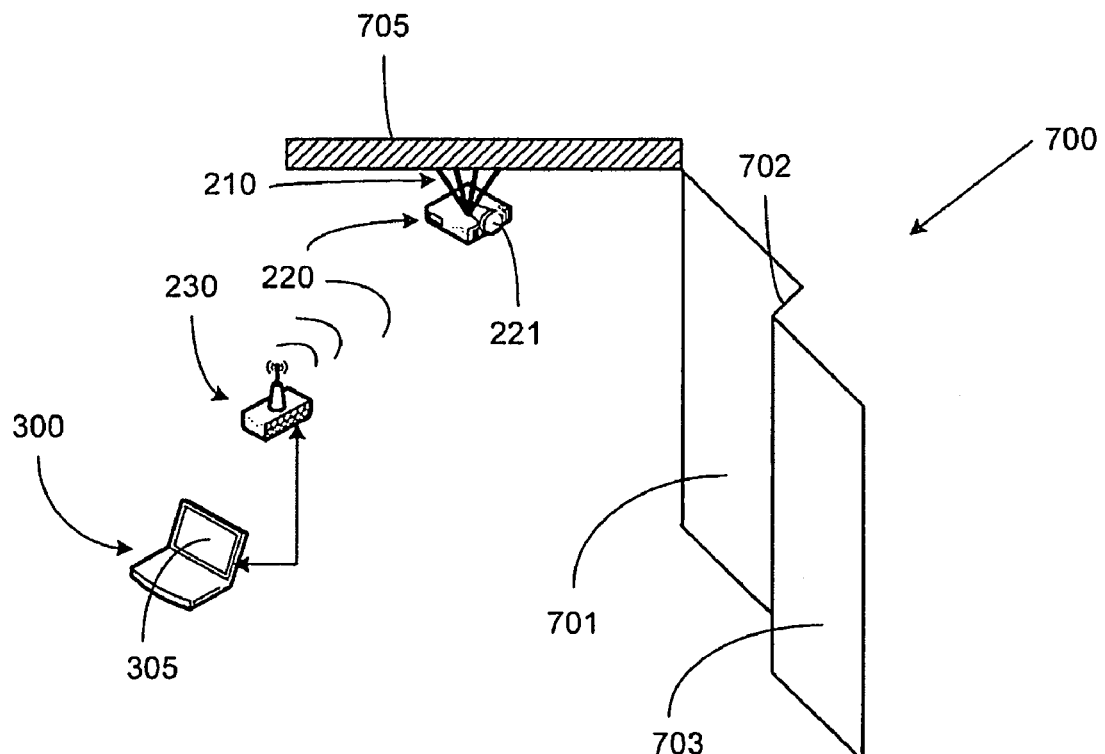
FIG. 14B is an illustration of the user's site when the image projection system is in the image capture mode.

Referring now to FIGS. 14A and 14B, the user then proceeds to the next step of setup by activating a setup/mapping/capture interface 253A. When this interface 253 is activated, the projector apparatus 220 is instructed to switch to an image capture mode (i.e., the image sensor sub-system 226 is activated by manipulation of the minor 227 and the projector sub-system 225 is deactivated). As a result, the projector apparatus 220 captures and transmits an image of the architecture 700A (as seen through the lens 221) to the computer 300 for display within the setup/mapping/capture interface 253. The enables the user to "see" what the projector "sees." as the point of view is the same. i.e. through the lens 221. The image of the architecture 700A can then be permanently or temporarily saved on the computer 300.

Figure 15A:
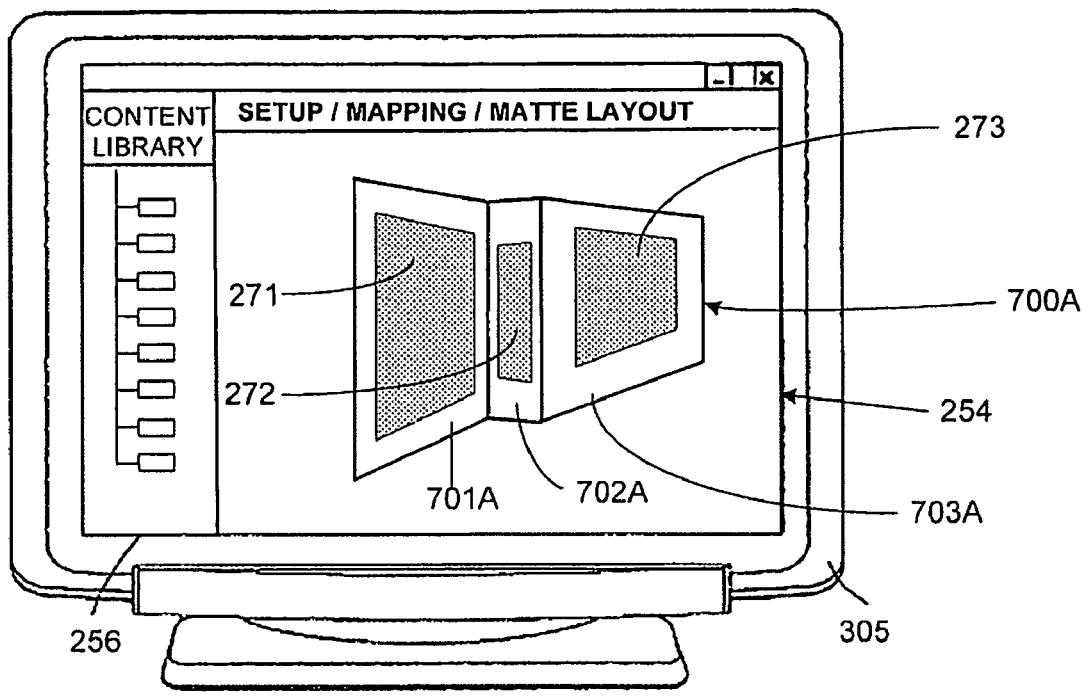
FIG. 15A is an illustration of the computer of the image projection system wherein the video imaging system is in the matte layout portion of a mapping mode, and wherein blank mattes have been inserted atop the captured image of the architecture.
Figure 15B:
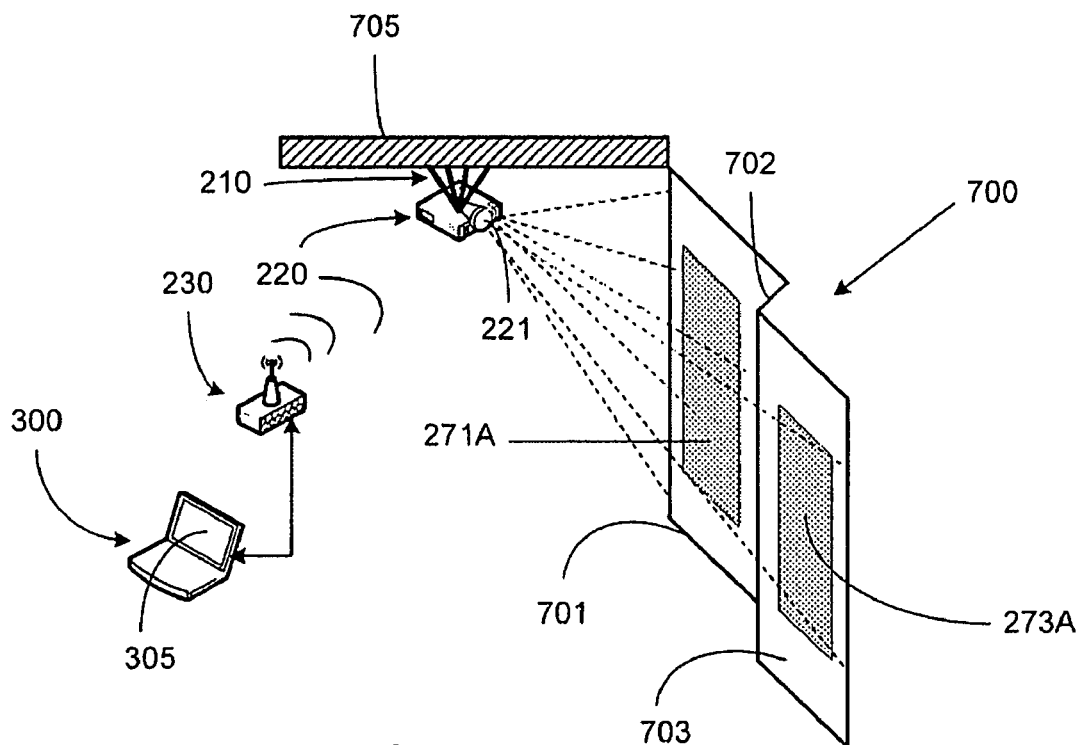
FIG. 15B is an illustration of the user's site having the contents of the video compositing application of FIG. 15A projected onto the architecture, wherein the projected images of the blank mattes are not aligned with the desired surfaces of the architecture.

Referring now to FIGS. 15A and 15B, the user then proceeds to the next step which is to activate the mapping portion of the software by entering a setup/mapping/matte layout interface 254. When this interface 254 is activated, the projector apparatus 220 is instructed to switch back to projection mode (i.e., the projector sub-system 225 is activated by manipulation of the mirror 227 and the image sensor sub-system 226 is deactivated). The image of the architecture 700A remains visible in the interface 254 as an underlying "layer" upon which the user can then create (and/or insert) blank mattes 271-273 atop. The "layer" with the mattes 271-273 is projected by the projector apparatus 220 onto the real world architecture 700, thereby projecting images of the mattes 271A-273A onto the real world architecture 700. The user adds the appropriate number of the mattes 271-273 necessary (and/or desired) to cover the surfaces 701-703 of the architecture. Preferably, a single matte is added for each different real world surface of the architecture so that optical distortion can be remedied later. However, the invention is not so limited and multiple mattes can be used for a single real world surface and/or a single matte can be used for multiple real world surfaces.

Figure 16A:
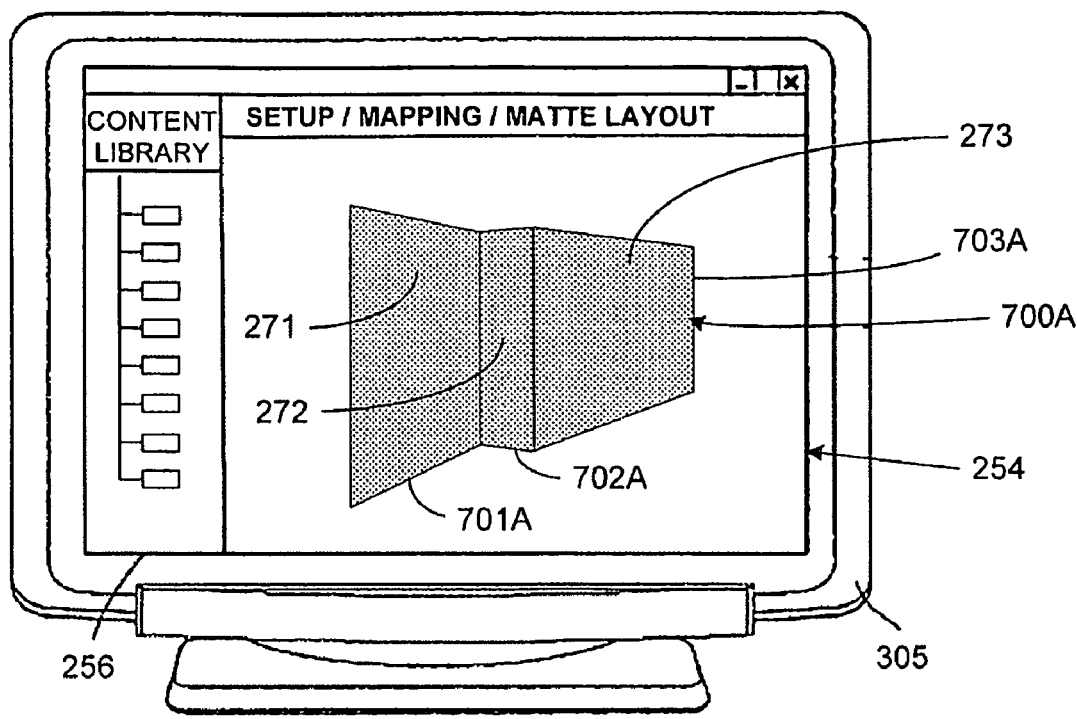
FIG. 16A is an illustration of the computer of the image projection system wherein the video imaging system is in the corner pin portion of the mapping mode, and wherein the shape and position of the blank mattes have been adjusted so that the projected images of the blank mattes are aligned with and overly the desired surfaces of the architecture.
Figure 16B:
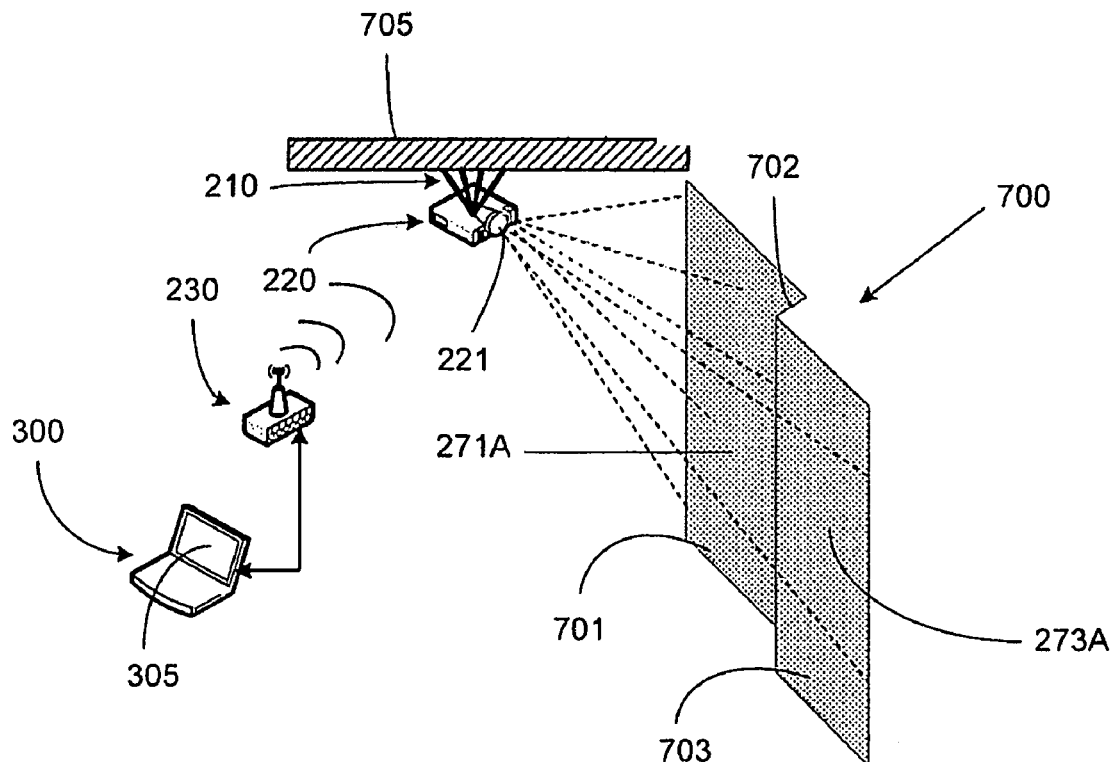
FIG. 16B is an illustration of the user's site having the contents of the video compositing application of FIG. 16A projected onto the architecture, wherein the projected images of the blank mattes correspond with the desired surfaces of the architecture.

Referring now to FIGS. 16A and 16B, one or more of the mattes 217-273 are generally positioned within the interface 254, the user then begins to adjust the size, shape, position, orientation, or any combination thereof of the blank mattes 271-273 within the interface 254 so that the edges of the blank mattes 271-273 are respectively aligned with and coincide with the edges of the images of the surfaces 701A-703A within the interface 254. In this manner, the underlying "layer" of the image of the architecture 700A can be traced to create the blank mattes 271-273. As necessary, software tools such as rotating, scaling, corner pinning, skewing, positioning, or any combination thereof can be used.

As a result of properly sizing, shaping, positioning, and orienting the blank mattes 271-273 within the interface 254 as discussed above, the projected images of the mattes 271A-273A correspond to the real world surfaces 701-703 so that all of the edges of the projected images of the mattes 271A-273A coincide with the edges of the display surfaces 701-703 of the architecture 700. By this precise alignment, the edges of the projected matte images 271A-273A are invisible to a viewer and it appears as if the projected matte images 271A-273A perfectly conform to the display surfaces 701-703 respectively. Of course, and if necessary, the user can further fine tune the size, shape, position, orientation, or any combination thereof of the blank mattes 271-273 using real-world observation and comparative technique discussed above. Furthermore, once done creating mattes, the user can also use a corner pinning type tool to make sure that the optical distortion (if any) is compensated for.

Figure 17A:
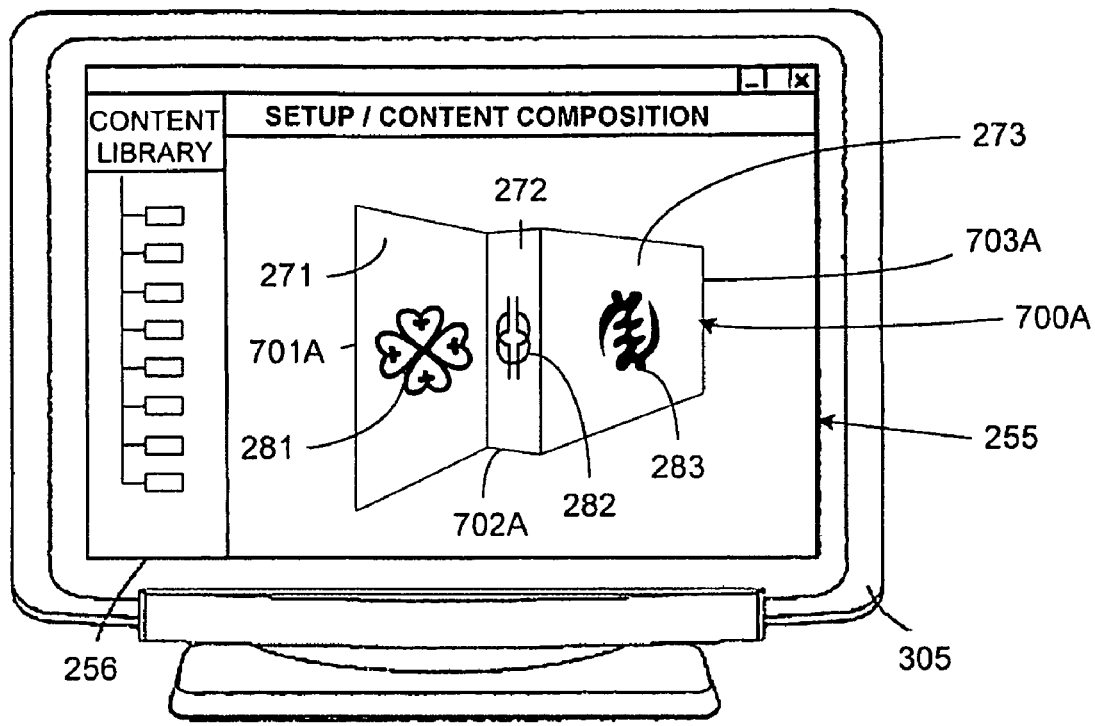
FIG. 17A is an illustration of the computer of the image projection system wherein the video imaging system is in a content composition mode, wherein imagery content has been inserted into the blank mattes and corrected for optical distortion.
Figure 17B:
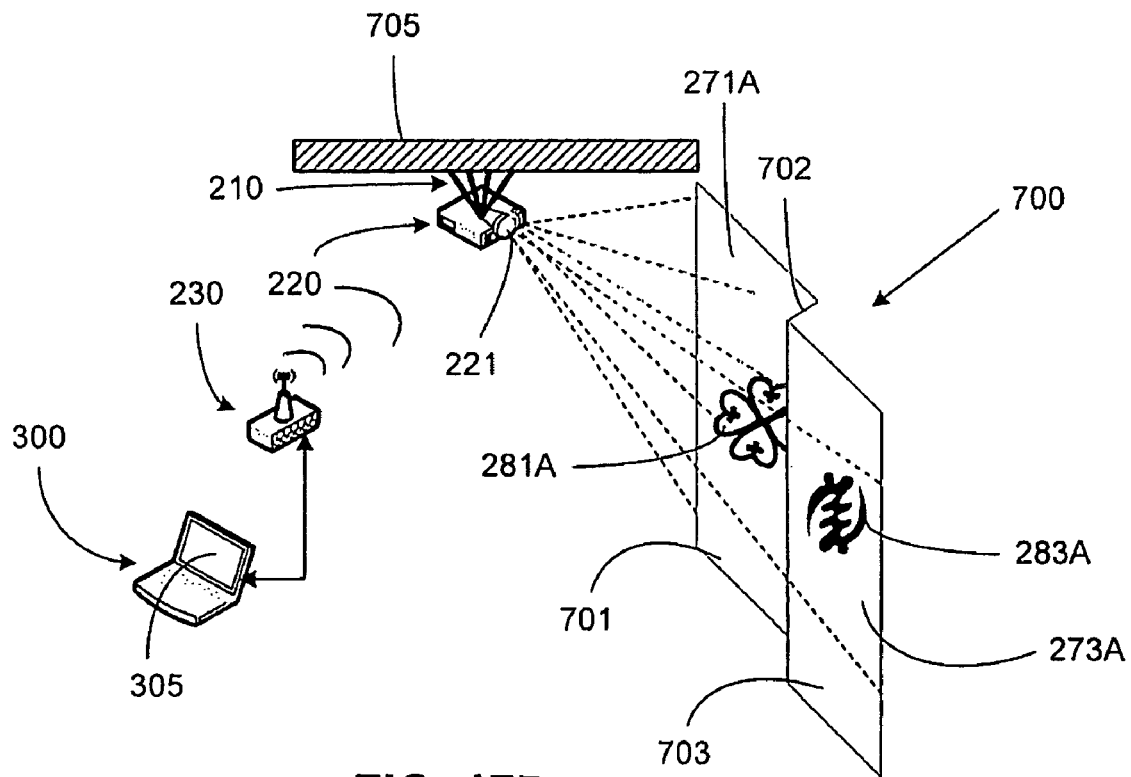
FIG. 17B is an illustration of the user's site having the contents of the video compositing application of FIG. 17A projected onto the architecture, wherein the mattes and the associated imagery content are projected on the architecture in a video loop.
Figure 18:
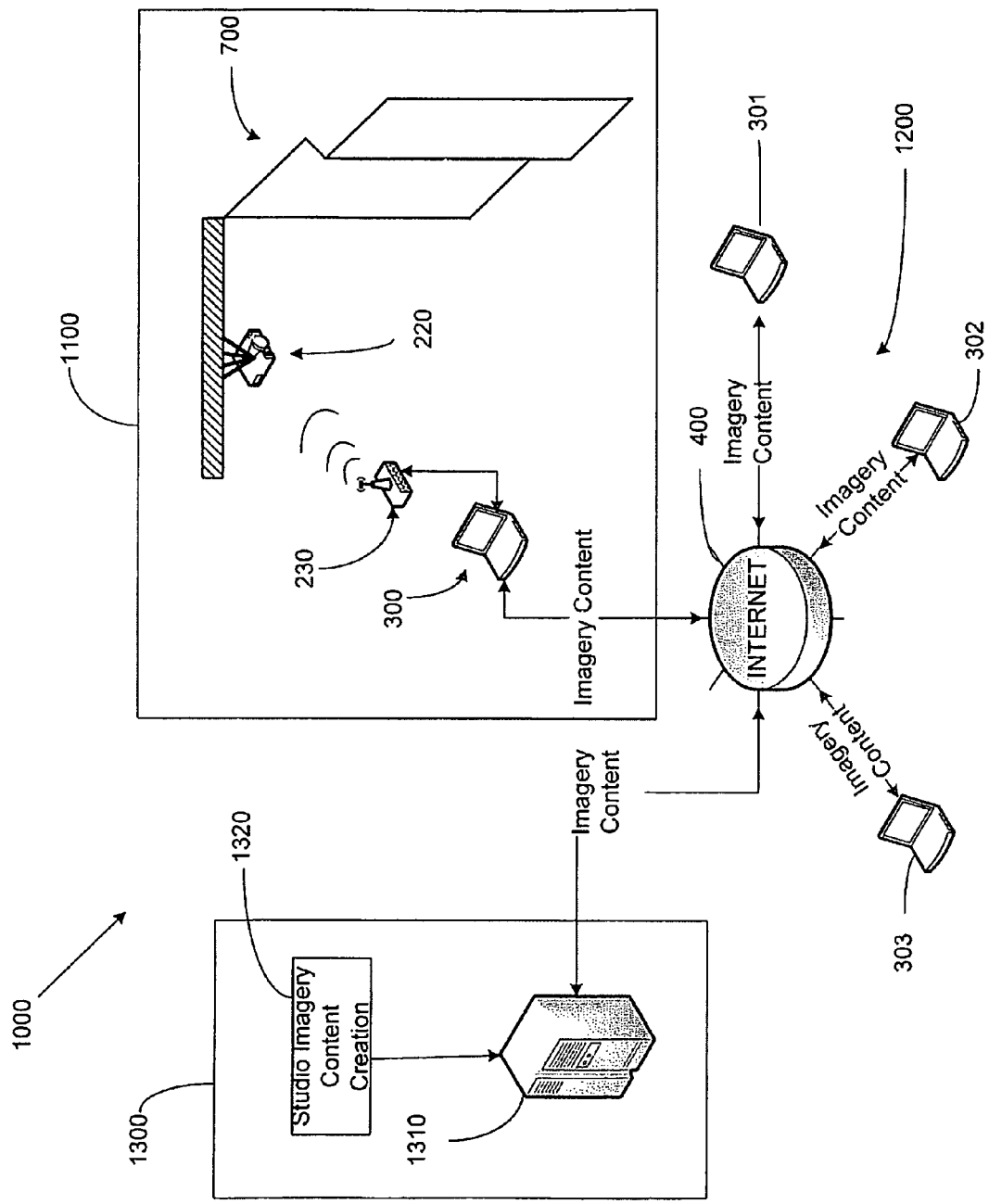
FIG. 18 is a schematic of a system for distributing and/or displaying video projection clips over a wide area network.
Figure 20:
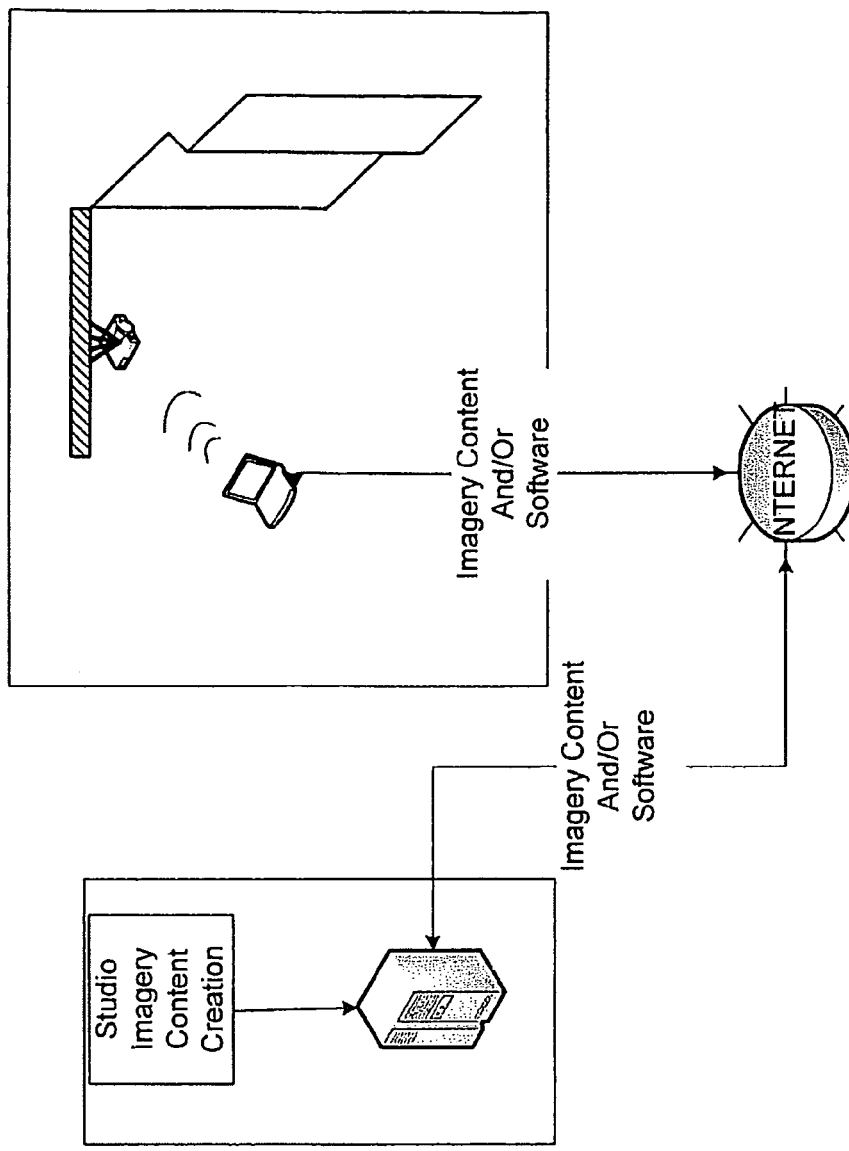
FIG. 20 is a schematic of a system for distributing and/or displaying video projection clips over a wide area network according to an alternate embodiment of the present inventions.

Referring now to FIGS. 17A and 17B, once the matte layout is complete, the user enters a content composition interface 255 to select what imagery content he/she wants to project on the architecture 700. The user selects the desired imagery content file from a content library 256. The content library 256 is a file folder-based organization system containing all of the user's imagery content files that can be inserted into the mattes 271-273 and thus projected onto the architecture. The imagery content files can be any suitable data format for rendering still images or videos. As will be described in detail below with respect to FIG. 18, the present invention also provides a new way by which a use can build his/her image projection content library.

Once the user selects the desired content file whose imagery he/she wants projected onto the architecture, the user associates the selected imagery content file with the desired matte 271-273. This can be done in any suitable way, such as a drag-and-drop technique or traditional command association.

In the example, three different symbols 281-283 (static content files) have been added to the mattes 271-273 as the desired imagery content. While the imagery content is exemplified as simple static symbols, the invention is not so limited. The imagery content can include, without limitation, still photographs, video clips, still digital images, streaming digital video, movies, or any other visual content.

Because the projection angle of the projector apparatus 220 is not normal to the non-coplanar and non-adjacent display surfaces 701-703, the projection of the imagery content on the display surfaces 701-703 will experiences substantial optical distortion if not connected. Wile the projection of the imagery content would be visibly distorted, it should be noted that the imagery content would still be properly aligned with and overlays the display surfaces 701-703. This is because the projection of the imagery content is limited to the space within the projected images of the mattes 271A-273A, which were sized and oriented in the steps described above.

The optical distortion of the projected imagery content 281A-283A on the display surfaces 701-703 can be fixed by the user adjusting the internal properties of the mattes 271-273 to compensate for the optical distortion. This is done by using tools within the video compositing application, including, without limitation, rotating, scaling, corner pinning, general positioning, skewing, or any combination thereof. Adjusting the internal properties of the mattes results in a corresponding change in how the imagery content is projected onto the display surfaces in real time. As mentioned above, this is made possible by using the live video preview function of the video compositing application. Such correction would be especially effective when utilizing text imagery in the projections.

This completes the mapping and content selection procedure. The general layout of the interface 255 (i.e. the map), including the matte coordinates and the internal properties of each matte can then be saved either internally or on an external memory device. The user can then utilize the saved map in the future to insert any piece of imagery content and/or change the imagery content as desired. As a result, the user can easily change the imagery content to be projected onto the architecture 700 without having to go through the mapping procedure by simply inserting new imagery content into the mattes. The internal matte properties will automatically be applied to the new imagery content.

Once the map and desired imagery content is inserted into the mattes, a loop is designed and rendered within the video compositing application to effectuate continuous play of the imagery content. This data, including the looped imagery content, is compressed, e.g., in a mpeg-2 format, and then transmitted to the control unit 230 for internal storage. The control unit can store the data either internally or read it from an external memory device (see FIG. 11).

Once the control unit 230 has the necessary data, the control unit is switched to a display mode wherein the data (including the map and associated imagery content) is retrieved and projected onto the architecture 700 in a looped fashion via the projector apparatus 220. Once the user has created a composition and is ready to create their own customized loop or "mix" they than tell the program to compile or render and the CPU in the head unit compiles and flattens the mix into a single playable file. Once this file is compiled, it is playable via a playlist/playback application that the user can control from their laptop/phone/remote etc. The user than switches the head unit to playback mode and uses this for playback System and Method of Content Distribution and/or Display Referring now to FIG. 18, a content distribution system 1000 is illustrated. The content distribution system 1000 comprises a front end portion 1100, a WAN portion 1200, and a back end portion 1300. The front end portion 1100 is an end user's site that comprises the image projection kit 200 installed as described above. The content distribution system 1000 provides a new and non-obvious way of providing users with projection clips (i.e., video imagery content) for their content libraries for projection onto their real world architecture 700.

A user using the image projection kit 200 as described above will want to change their imagery content often, for example, depending on the event at the user site and/or the time of year. Using the content distribution system 1000, the user can build a very large library of projection clips and other imagery files for projection.

The user's computer 300 is connected to a WAN, such as Internet 400, which is in turn connected to a large number of end computers 301-303. A content server 1310 is provided that stores a large number of content files (e.g., projection clips) that are created either in a studio 1320 or uploaded and stored on the server 1310 by other users via their computers 301-303. Of course, content uploaded by other users via their computers 301-303 should be monitored and/or censored as appropriate. The large number of content files stored on the server 1310 are made accessible, searchable, viewable and downloadable to the end user's computer 300 via a website or other electronic access point.

The website has the proper interfaces and databases necessary to store and authenticate a user's information, identity and/or financial information. For example, a user may be required to enter her/his credit card information to create an account. The account will be assigned a user ID and a password. The website charges a fee for each projection clip downloaded by the user. The fee can be charged to a standing account that is set up by the user or on a single-purchase basis.

While the invention has been described and illustrated in sufficient detail that those skilled in this art can readily make and use it, various alternatives, modifications, and improvements should become readily apparent without departing from the spirit and scope of the invention. For example, entirely different and unrelated imagery content can be inserted into different mattes for simultaneous projection onto different surfaces of the same architecture. Moreover, the invention is not limited to any specific software but can be carried out on any software application capable of carrying out the aforementioned functions.

What is claimed is:

1. A kit for projecting imagery content onto architecture comprising:
   a projector apparatus comprising a housing containing an image sensor sub-system and an image projector sub-system, a single-reflex lens assembly in operable cooperation with the image sensor sub-system and the image projector sub-system, at least one port for receiving and/or sending data signals, and a processor operably connected to the image sensor sub-system, the image projector sub-system and the at least one port of the projector apparatus;
   a mechanism for mounting the projector apparatus in a fixed orientation having a line a sight to the architecture;
   a control unit comprising a housing, at least one port for receiving and/or sending data signals and a processor operably connected to the at least one port of the control unit; and
   a software package for installation on a computer, the software package containing computer code for rendering a composition window on the computer wherein a map corresponding to the architecture can be created, the map comprising at least one matte whose image is projected onto a surface of the architecture, and wherein the size, shape, position, orientation, or any combination thereof of the at least one matte can be adjusted within the composition window so that the projected image of the matte corresponds with the surface of the architecture.

2. The kit of claim 1 wherein the projector apparatus adjustably mounts to the mounting mechanism, the mounting mechanism having a locking mechanism for securing the projector apparatus in the fixed orientation.

3. The kit of claim 1 wherein the software package is distributed in the kit as a password that allows a used to access and download the computer code onto the computer via a wide area network.

4. The kit of claim 1 wherein the software package further comprises a plurality of imagery content files that can be inserted into the at least one matte, the imagery content being projected onto the surface of the architecture.

5. The kit of claim 1 wherein the software package contains a imagery content library comprising a plurality of imagery content data files that can be inserted into the at least one matte via a drag and drop technique.

6. The kit of claim 1 wherein the control unit further comprises a memory slot for receiving an external memory device.

7. The kit of claim 1 wherein the control unit controls the operation of the projector apparatus.

8. The kit of claim 7 wherein the processor of the control unit can create execute the map created using the software package and imagery content files inserted into the at least one matte of the map so as to create a video loop.

9. The kit of claim 1 wherein the control unit comprises means for switching the projector apparatus between operation of the image sensor sub-system and the image projector sub-system.

* * * * *